US006421581B1

(12) United States Patent
Hamamoto et al.

(10) Patent No.: US 6,421,581 B1

(45) Date of Patent: Jul. 16, 2002

(54) PRINTER WITH IMPROVED PAGE FEED

(75) Inventors: Akihiko Hamamoto, Irvine, CA (US); Akitoshi Yamada, Yokohama (JP); Peter L. Cheng; Takao Aichi, both of Irvine, CA (US); Hiromitsu Hirabayashi, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 15 days.

(21) Appl. No.: 09/660,352

(22) Filed: Sep. 12, 2000

(51) Int. Cl.[7] ............................ G06F 7/00; B65H 5/22; B65H 83/00; B65H 85/00

(52) U.S. Cl. .................... 700/223; 271/3.14; 271/3.16; 271/1.52; 271/258.03

(58) Field of Search ......................... 700/223; 271/3.14, 271/3.15, 3.16, 152, 153, 154, 155, 258.03

(56) References Cited

U.S. PATENT DOCUMENTS 3,940,746 A 2/1976 Vittorelli ................. 340/172.5
4,028,680 A 6/1977 Vittorelli ................. 340/172.5
4,028,681 A 6/1977 Vittorelli ................. 340/172.5
4,251,871 A 2/1981 Yu ............................ 364/518
4,279,199 A 7/1981 Blanco et al. ........... 101/93.05
4,304,497 A 12/1981 Cavill et al. ................ 400/583
4,326,813 A 4/1982 Lomicka, Jr. et al. ...... 400/124
4,353,298 A 10/1982 Baker et al. ............. 101/93.05
4,353,653 A 10/1982 Zimmerman ................. 400/70
4,372,699 A 2/1983 Quinn, Jr. ................... 400/625
4,452,136 A 6/1984 Boynton et al. ......... 101/93.05
4,475,830 A 10/1984 Schaefer ..................... 400/238
4,500,216 A 2/1985 Demonte et al. .............. 400/8
4,551,813 A * 11/1985 Sanbayashi et al. .... 271/258 X
4,553,866 A 11/1985 Demonte et al. ........ 400/144.2
4,596,478 A 6/1986 DeGeorge et al. ............ 400/76
4,627,749 A 12/1986 Meo et al. .................. 400/121
4,737,645 A 4/1988 Lahr ....................... 250/458.1
4,804,998 A * 2/1989 Miyawaki ............... 271/258 X
4,844,635 A 7/1989 Malkemes et al. .......... 400/124
4,848,944 A 7/1989 Fuller et al. ................ 400/629
4,859,099 A 8/1989 Kanemoto et al. ....... 400/636.1
5,000,592 A 3/1991 Grady ......................... 400/68
5,018,716 A * 5/1991 Yoshida et al. ......... 271/277 X
5,226,743 A 7/1993 Jackson et al. ............. 400/625
5,245,354 A 9/1993 Ono et al. ................... 346/1.1
5,247,337 A * 9/1993 Malachowski .......... 355/308 X
5,263,784 A 11/1993 Nojima et al. .............. 400/570
5,287,123 A 2/1994 Medin et al. ........... 346/140 R
5,296,873 A 3/1994 Russell et al. ................ 346/25

(List continued on next page.)

*Primary Examiner*—Christopher P. Ellis
*Assistant Examiner*—Gene O. Crawford
(74) *Attorney, Agent, or Firm*—Fitzpatrick, Cella, Harper & Scinto

(57) ABSTRACT

Feeding a plurality of successive sheets of a recording medium by calculating an expected time for a page end detection of a current sheet, and feeding a next sheet of the successive sheets in accordance with the calculated time, but prior to detection of the page end of the current sheet. Calculating the expected time may be detecting the page end for the current sheet, and mathematically filtering the page end detection of the current sheet with a current estimate of expected time for page end detection of the next sheet. The current estimate may be initialized after a first sheet of the successive sheets with a page end detection of the first sheet. The feeding of the next sheet may be controlled by controlling a time between the current sheet and the next sheet based on a time between the page end detection of the current sheet and a detection of the next sheet so as to obtain and maintain the time within a target range. Whether the page end detection of the current sheet is detected within a threshold amount of time after feeding of the next sheet has commenced may be determined, and where the page end of the current sheet is not detected within the threshold, the feeding of the next sheet is interrupted and a recovery process is engaged. The recovery process may be waiting for a page end detection of the current sheet and re-initiating feeding of the next sheet.

24 Claims, 18 Drawing Sheets

U.S. PATENT DOCUMENTS

| | | | | | |
|---|---|---|---|---|---|
| 5,329,295 | A | | 7/1994 | Medin et al. | 346/25 |
| 5,355,151 | A | | 10/1994 | Yoshida et al. | 347/61 |
| 5,380,109 | A | * | 1/1995 | Eckert, Jr. et al. | 271/258 X |
| 5,427,462 | A | | 6/1995 | Jackson et al. | 400/579 |
| 5,428,384 | A | | 6/1995 | Richtsmeier et al. | 347/102 |
| 5,446,487 | A | | 8/1995 | Russell et al. | 347/102 |
| 5,449,240 | A | | 9/1995 | Dorpfeld et al. | 400/427 |
| 5,467,119 | A | | 11/1995 | Richtsmeier et al. | 347/102 |
| 5,485,180 | A | | 1/1996 | Askeland et al. | 347/15 |
| 5,489,926 | A | | 2/1996 | Arbeiter | 347/16 |
| 5,500,667 | A | | 3/1996 | Schwiebert et al. | 347/102 |
| 5,505,549 | A | | 4/1996 | Ishiguro | 400/61 |
| 5,589,866 | A | | 12/1996 | Russell et al. | 347/102 |
| 5,624,196 | A | | 4/1997 | Jackson et al. | 400/625 |
| 5,669,721 | A | | 9/1997 | Santon et al. | 400/279 |
| 5,710,588 | A | | 1/1998 | Malhotra | 347/153 |
| 5,758,981 | A | | 6/1998 | Lesniak et al. | 400/625 |
| 5,769,299 | A | * | 6/1998 | Negoro | 399/384 X |
| 5,777,656 | A | | 7/1998 | Henderson | 347/251 |
| 5,810,494 | A | | 9/1998 | Menard et al. | 400/634 |
| 5,826,135 | A | * | 10/1998 | Lee | 399/43 |
| 5,890,821 | A | | 4/1999 | Lesniak et al. | 400/625 |
| 5,949,450 | A | | 9/1999 | Elley et al. | 347/40 |
| 5,988,627 | A | * | 11/1999 | Lin et al. | 271/152 X |
| 6,065,830 | A | | 5/2000 | Hiramatsu et al. | 347/104 |
| 6,144,814 | A | * | 11/2000 | Newell, Jr. et al. | 271/3.15 X |
| 6,290,225 | B1 | * | 9/2001 | Linder et al. | 271/155 X |
| 6,311,039 | B1 | * | 10/2001 | Funamizu et al. | 399/394 X |

* cited by examiner

PRINTER WITH IMPROVED PAGE FEED

BACKGROUND OF THE INVENTION

1. Field of the Invention

The present invention relates to feeding of a recording medium in printers. More specifically, the present invention relates to controlling the timing for feeding a next sheet of a recording medium based on a calculation of an expected detection of an end of a current sheet so that feeding of the next sheet is initiated prior to detection of the end of the current sheet.

2. Description of the Related Art

Printers print images onto a sheet of paper that is fed through the printer by a series of rollers that are actuated by one or more motors. Generally, paper feeding is performed by the following components: a paper tray, an automatic sheet feed (ASF) roller, a line feed (LF) roller, an ASF motor for actuating the ASF roller, a LF motor for actuating the LF roller, a page edge (PE) sensor, and a controller. Each of these components operate in conjunction with one another to feed a sheet of paper from the paper tray through the printer.

Generally, when printing is to commence, the controller sends a signal to the ASF motor to actuate and to begin turning the ASF roller. The ASF roller rotates to pick up a sheet of paper from the paper tray and feeds it into the printer so that a leading edge of the paper engages a registration position. The registration position provides for a known starting point for paper feeding during printing and is located in a proximity to the LF roller. As the paper is fed into the printer by the ASF roller, the PE sensor senses when the leading edge of the paper has been encountered and sends a signal to the controller, thereby confirming that the paper has been fed into the printer.

After the paper has been fed into the printer to the registration position, the controller stops the ASF motor and sends a signal to the LF motor to start turning. The LF motor engages the LF roller which rotates to pick up the leading edge of the paper and to feed it through the printer while a recording head prints an image onto the paper. When the image has been printed, the controller signals the LF motor to rotate to eject the paper from the printer. As the paper is being ejected from the printer, the PE sensor senses the trailing edge of the paper and sends a signal to the controller. When the controller receives the signal from the PE sensor indicating that the end of the sheet has been detected, the controller starts the process over for the next sheet.

Thus, when printing multi-page print jobs, conventional printers do not begin feeding the next sheet until the end of the current sheet has been detected. Waiting to detect the end of the current sheet before starting to feed the next sheet means that more time is required for processing the print job. For instance, if it takes one second from the time the end of the current sheet is detected until the next sheet begins to be fed, then the total processing time for a 60 page print job would be increased by one minute due to the page feeding operations. Therefore, one way to reduce the processing time for printing multi-page print jobs would be to reduce the time for loading a next sheet during printing.

One way to address the foregoing could be to locate the mechanical components closer to each other so that the paper does not have to travel as far during the feeding operation. However, this solution would not be practical for existing printers since it would require costly structural and mechanical changes. Moreover, physical constraints may limit the proximity that the components can be located relative to each other.

Another way to address the foregoing may be to provide a faster ASF motor. However, such a motor may be more costly than existing motors and may also require complex and costly hardware changes to existing printers.

Therefore, what is needed is a way to reduce printing time by reducing the time required for feeding successive sheets of paper without requiring costly hardware changes.

SUMMARY OF THE INVENTION

The present invention addresses the foregoing by initiating feeding of a next sheet prior to detection of the end of a current sheet. Initiating feeding of a next sheet without waiting for the end of the current sheet to be detected reduces the time required for printing multi-page print jobs since the time required for feeding is reduced.

According to one aspect, the invention may be feeding a plurality of successive sheets of a recording medium into a printer by calculating an expected time when a page end detection of a current sheet of the successive sheets is expected, and feeding a next sheet of the successive sheets in accordance with the calculated time, but prior to detection of the page end of the current sheet.

As a result of the foregoing, successive sheets are fed into the printer faster than conventional printers since the next sheet begins being fed into the printer without waiting for the end of the current sheet to be detected. Therefore, the time required for printing multi-page print jobs is reduced since the time required for feeding the paper is reduced. Additionally, the invention can be implemented in existing printers as software or firmware without the need for costly and possibly impracticable hardware changes.

In calculating the expected time, the invention may provide for detecting the page end for the current sheet, and mathematically filtering the page end detection of the current sheet with a current estimate of expected time for page end detection of the next sheet so as to update the estimate throughout processing of the successive sheets. The current estimate may be initialized after a first sheet of the successive sheets with a page end detection of the first sheet.

Additionally, the feeding of the next sheet may be controlled by controlling a time between the current sheet and the next sheet based on a time between the page end detection of the current sheet and a detection of the next sheet. The time between the current sheet and the next sheet may be controlled to obtain and maintain the time within a target range.

Controlling the time for feeding the sheets based on the time between the page end detection of the current sheet and detection of the next sheet provides for a reduction in the distance between each successive sheet until a target distance is obtained. As a result, a more optimum spacing can be achieved, thereby reducing the processing time even more.

In related aspects, the invention may provide for determining whether the end of the current sheet is detected within a threshold amount of time after feeding of the next sheet has commenced, and, in a case where it is determined that the end of the current sheet is not detected within the threshold, feeding of the next sheet is interrupted and a recovery process is engaged. The recovery process may be waiting to detect the end of the current sheet and re-initiating feeding of the next sheet.

These further aspects provide additional ways for the printer to optimize the spacing between sheets being fed into the printer. This is accomplished by detecting whether the end of the current sheet has cleared the edge detector prior to the next sheet's leading edge approaching the detector. This helps to optimize the distance between sheets and reduces the possibility of a paper jam.

This brief summary has been provided so that the nature of the invention may be understood quickly. A more complete understanding of the invention can be obtained by reference to the following detailed description of the preferred embodiment thereof in connection with the attached drawings.

DETAILED DESCRIPTION OF THE PREFERRED EMBODIMENTS

Figure 1:
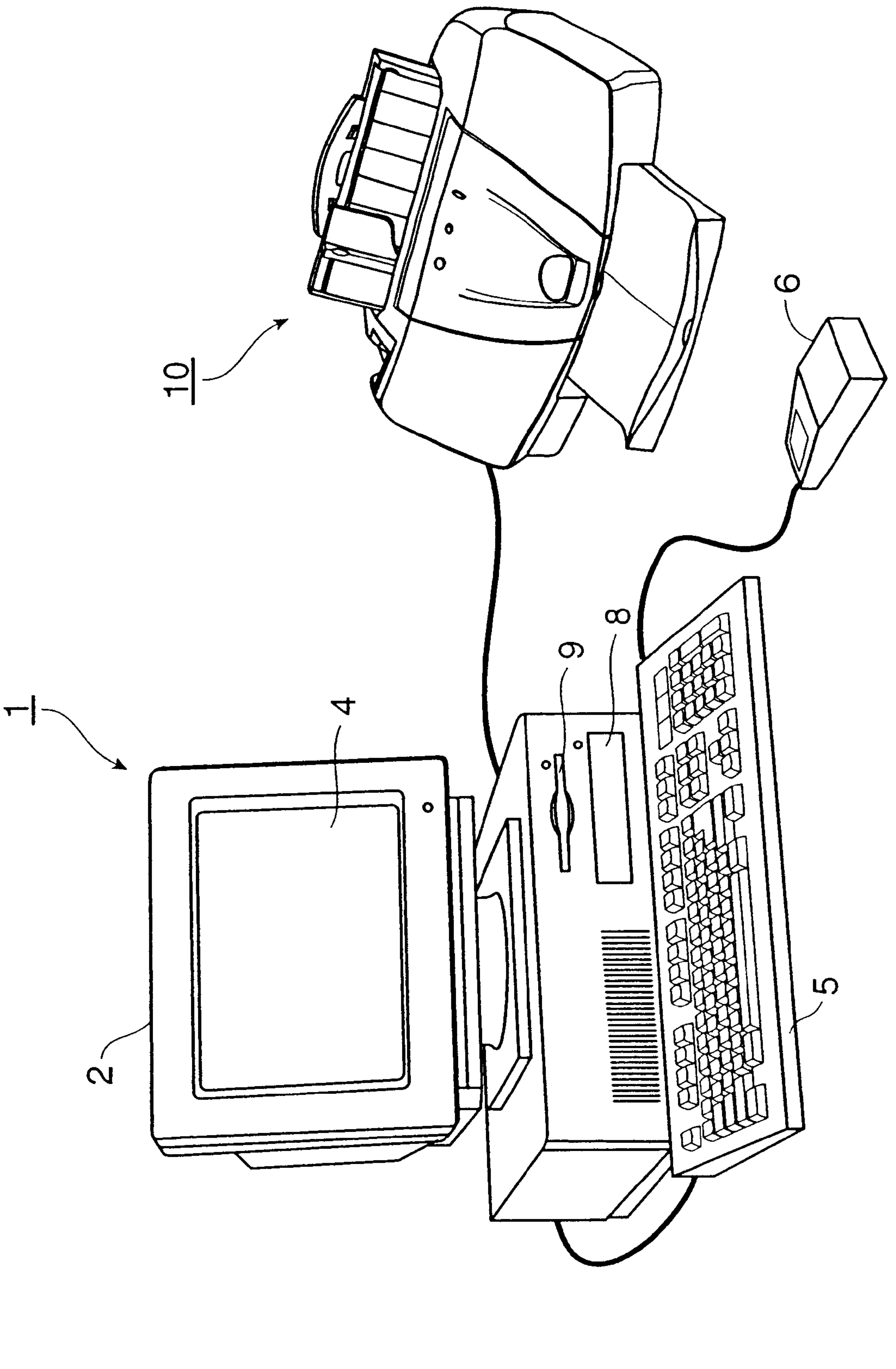
FIG. 1 shows a perspective view of computing equipment used in connection with the printer of the present invention.

FIG. 1 is a view showing the outward appearance of computing equipment used in connection with the invention described herein. Computing equipment 1 includes host processor 2. Host processor 2 comprises a personal computer (hereinafter "PC"), preferably an IBM PC-compatible computer having a windowing environment, such as Microsoft® Windows95. Provided with computing equipment 1 are display 4 comprising a color monitor or the like, keyboard 5 for entering text data and user commands, and pointing device 6. Pointing device 6 preferably comprises a mouse for pointing and for manipulating objects displayed on display 4.

Computing equipment 1 includes a computer-readable memory medium, such as fixed computer disk 8, and floppy disk interface 9. Floppy disk interface 9 provides a means whereby computing equipment 1 can access information, such as data, application programs, etc., stored on floppy disks. A similar CD-ROM interface (not shown) may be provided with computing equipment 1, through which computing equipment 1 can access information stored on CD-ROMs.

Disk 8 stores, among other things, application programs by which host processor 2 generates files, manipulates and stores those files on disk 8, presents data in those files to an operator via display 4, and prints data in those files via printer 10. Disk 8 also stores an operating system which, as noted above, is preferably a windowing operating system such as Windows95. Device drivers are also stored in disk 8. At least one of the device drivers comprises a printer driver which provides a software interface to firmware in printer 10. Data exchange between host processor 2 and printer 10 is described in more detail below.

Figure 2:
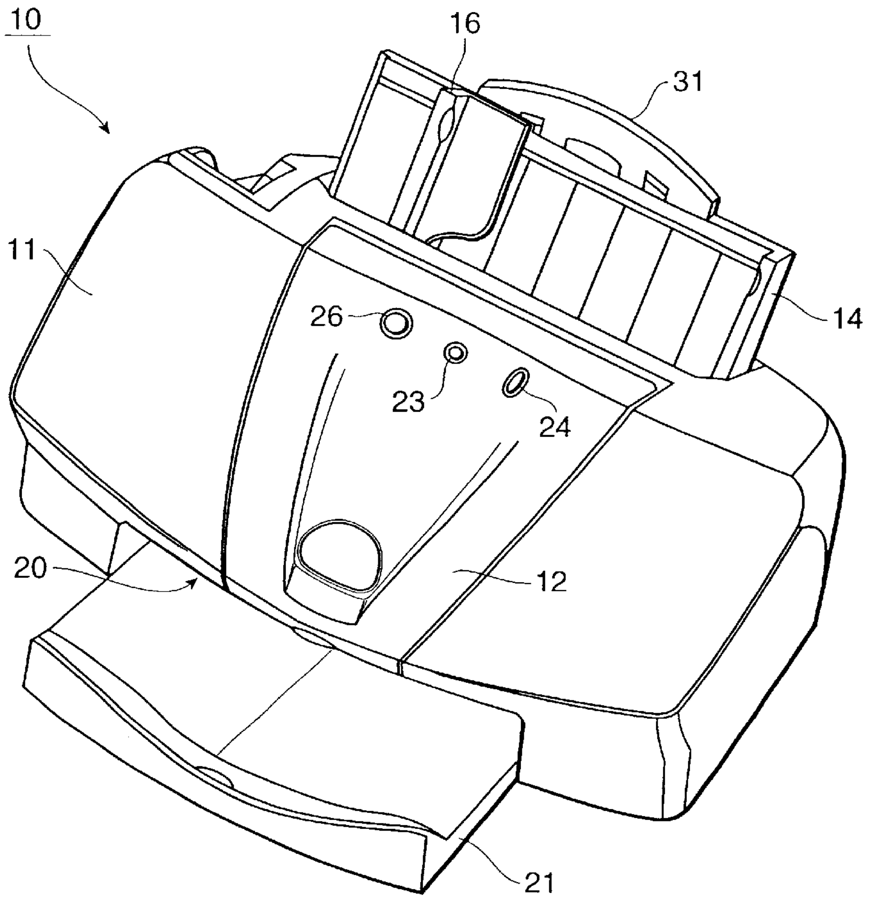
FIG. 2 is a front perspective view of the printer shown in FIG. 1.
Figure 3:
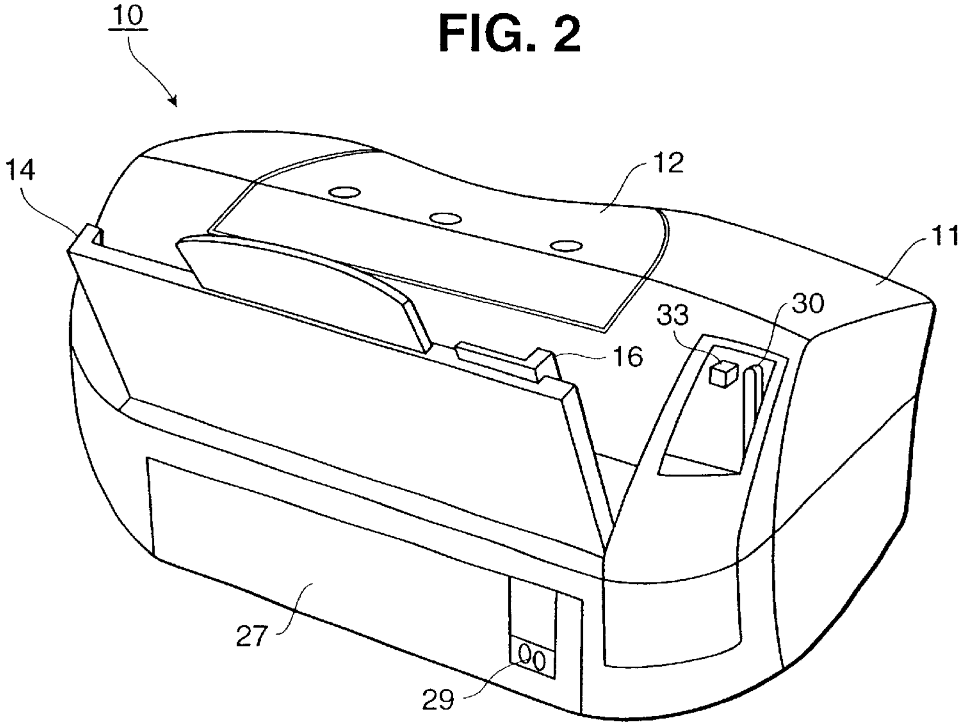
FIG. 3 is a back perspective view of the printer shown in FIG. 1.

FIGS. 2 and 3 show perspective front and back views, respectively, of printer 10. As shown in FIGS. 2 and 3, printer 10 includes housing 11, access door 12, automatic feeder 14, automatic feed adjuster 16, media eject port 20, ejection tray 21, power source 27, power cord connector 29, parallel port connector 30 and universal serial bus (USB) connector 33.

Housing 11 houses the internal workings of printer 10, including a print engine which controls the printing operations to print images onto recording media. Included on housing 11 is access door 12. Access door 12 is manually openable and closeable so as to permit a user to access the internal workings of printer 10 and, in particular, to access ink tanks installed in printer 10 so as to allow the user to change or replace the ink tanks as needed. Access door 12 also includes indicator light 23, power on/off button 26 and resume button 24. Indicator light 23 may be an LED that lights up to provide an indication of the status of the printer, i.e. powered on, a print operation in process (blinking), or a failure indication. Power on/off button 26 may be utilized to turn the printer on and off and resume button 24 may be utilized to reset an operation of the printer.

As shown in FIGS. 2 and 3, automatic feeder 14 is also included on housing 11 of printer 10. Automatic feeder 14 defines a media feed portion of printer 10. That is, automatic feeder 14 stores recording media onto which printer 10 prints images. In this regard, printer 10 is able to print images on a variety of types of recording media. These types include, but are not limited to, plain paper, high resolution paper, transparencies, glossy paper, glossy film, back print film, fabric sheets, T-shirt transfers, bubble jet paper, greeting cards, brochure paper, banner paper, thick paper, etc.

During printing, individual sheets which are stacked within automatic feeder 14 are fed from automatic feeder 14 through printer 10. Automatic feeder 14 includes automatic feed adjuster 16. Automatic feed adjuster 16 is laterally movable to accommodate different media sizes within automatic feeder 14. These sizes include, but are not limited to, letter, legal, A4, B5 and envelope. Custom-sized recording media can also be used with printer 10. Automatic feeder 14 also includes backing 31, which is extendible to support recording media held in automatic feeder 14. When not in use, backing 31 is stored within a slot in automatic feeder 14, as shown in FIG. 2.

As noted above, media are fed through printer 10 and ejected from eject port 20 into ejection tray 21. Ejection tray 21 extends outwardly from housing 11 as shown in FIG. 2 and provides a receptacle for the recording media upon ejection for printer 10. When not in use, ejection tray 21 may be stored within printer 10.

Power cord connector 29 is utilized to connect printer 10 to an external AC power source. Power supply 27 is used to convert AC power from the external power source, and to supply the converted power to printer 10. Parallel port 30 connects printer 10 to host processor 2. Parallel port 30 preferably comprises an IEEE-1284 bi-directional port, over which data and commands are transmitted between printer 10 and host processor 2. Alternatively, data and commands can be transmitted to printer 10 through USB port 33.

Figure 4:
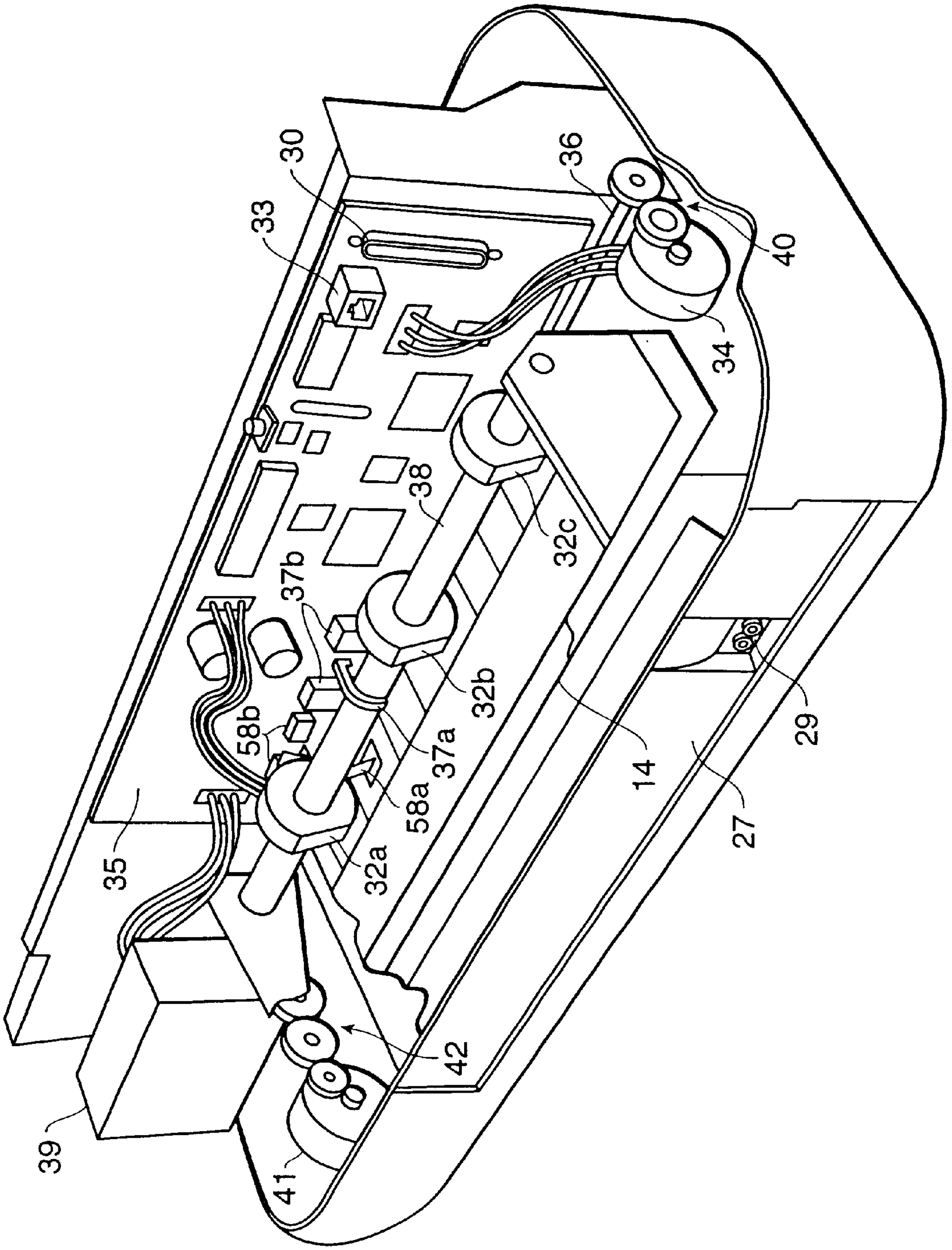
FIG. 4 is a back, cut-away perspective view of the printer shown in FIG. 1.
Figure 5:
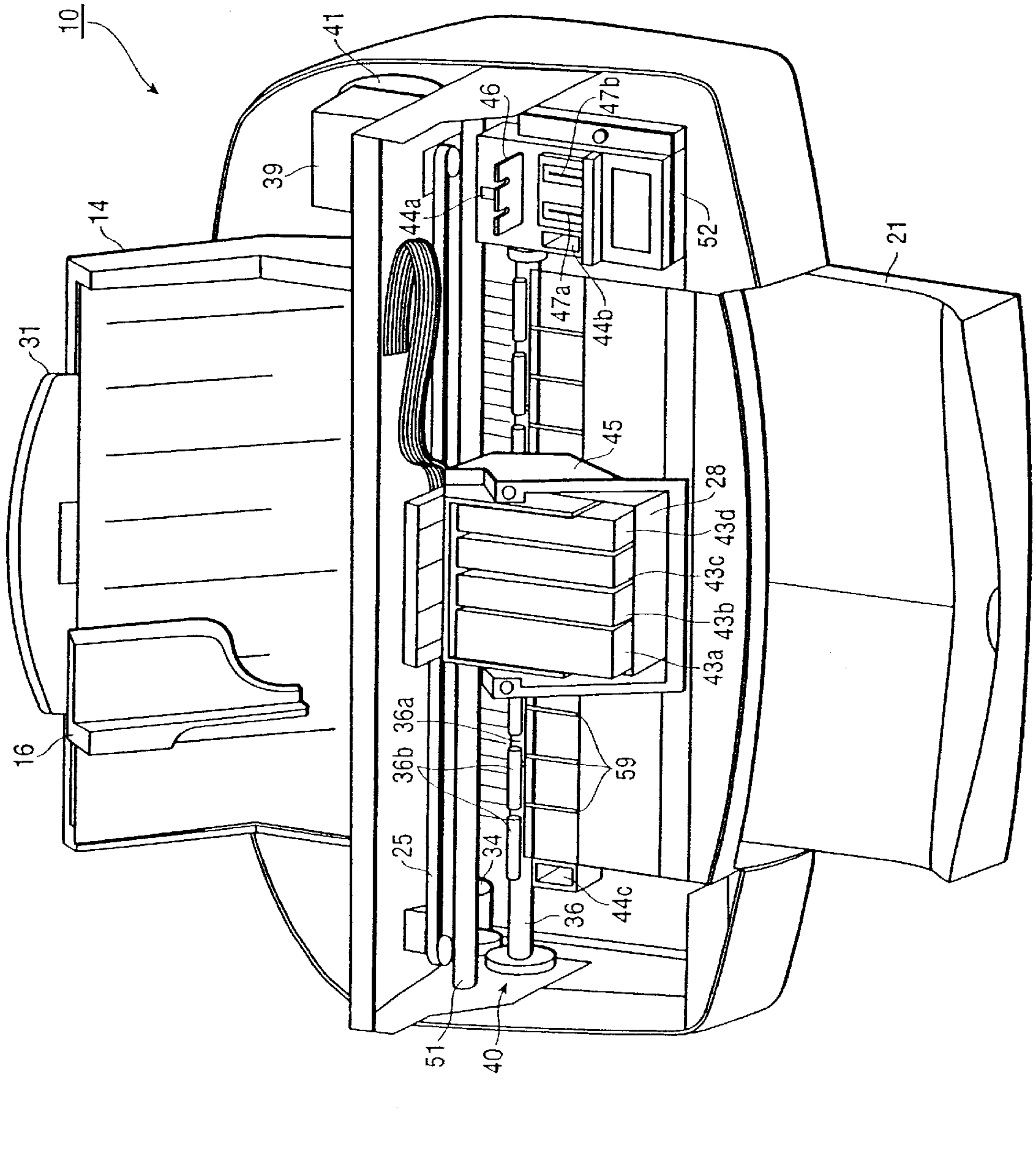
FIG. 5 is a front, cut-away perspective view of the printer shown in FIG. 1.

FIGS. 4 and 5 show back and front cut-away perspective views, respectively, of printer 10. As shown in FIG. 4, printer 10 includes an automatic sheet feed assembly (ASF) that comprises automatic sheet feeder 14, ASF rollers 32*a*, 32*b* and 32*c* attached to ASF shaft 38 for feeding media from automatic feeder 14. ASF shaft 38 is driven by drive train assembly 42. Drive train assembly 42 is made up of a series of gears that are connected to and driven by ASF motor 41. Drive train assembly 42 is described in more detail below with reference to FIGS. 6A and 6B. ASF motor 41 is preferably a stepper motor that rotates in stepped increments (pulses). Utilization of a stepper motor provides the ability for a controller incorporated in circuit board 35 to count the number of steps the motor rotates each time the ASF is actuated. As such, the position of the ASF rollers at any instant can be determined by the controller. ASF shaft 38 also includes an ASF initialization sensor tab 37*a*. When the ASF shaft is positioned at a home position (initialization position), tab 37*a* is positioned between ASF initialization sensors 37*b*. Sensors 37*b* are light beam sensors, where one is a transmitter and the other a receiver such that when tab 37*a* is positioned between sensors 37*b*, tab 37*a* breaks continuity of the light beam, thereby indicating that the ASF is at the home position.

Also shown in FIG. 4 is a page edge (PE) detector lever 58*a* and PE sensors 58*b*. PE sensors 58*b* are similar to ASF initialization sensors 37*b*. That is, they are light beam sensors. PE lever 58*a* is pivotally mounted and is actuated by a sheet of the recording medium being fed through the printer 10. When no recording medium is being fed through printer 10, lever 58*a* is at a home position and breaks continuity of the light beam between sensors 58*b*. As a sheet of the recording medium begins to be fed through the printer by the ASF rollers, the leading edge of the recording medium engages PE lever 58*a* pivotally moving the lever to allow continuity of the light beam to be established between sensors 58*b*. Lever 58*a* remains in this position while the recording medium is being fed through printer 10 until the trailing edge of the recording medium reaches PE lever 58*a*, thereby disengaging lever 58*a* from the recording medium and allowing lever 58*a* to return to its home position to break the light beam. The PE sensor is utilized in this manner to sense when a page of the recording medium is being fed through the printer and the sensors provide feedback of such to a controller on circuit board 35.

Figure 6A:
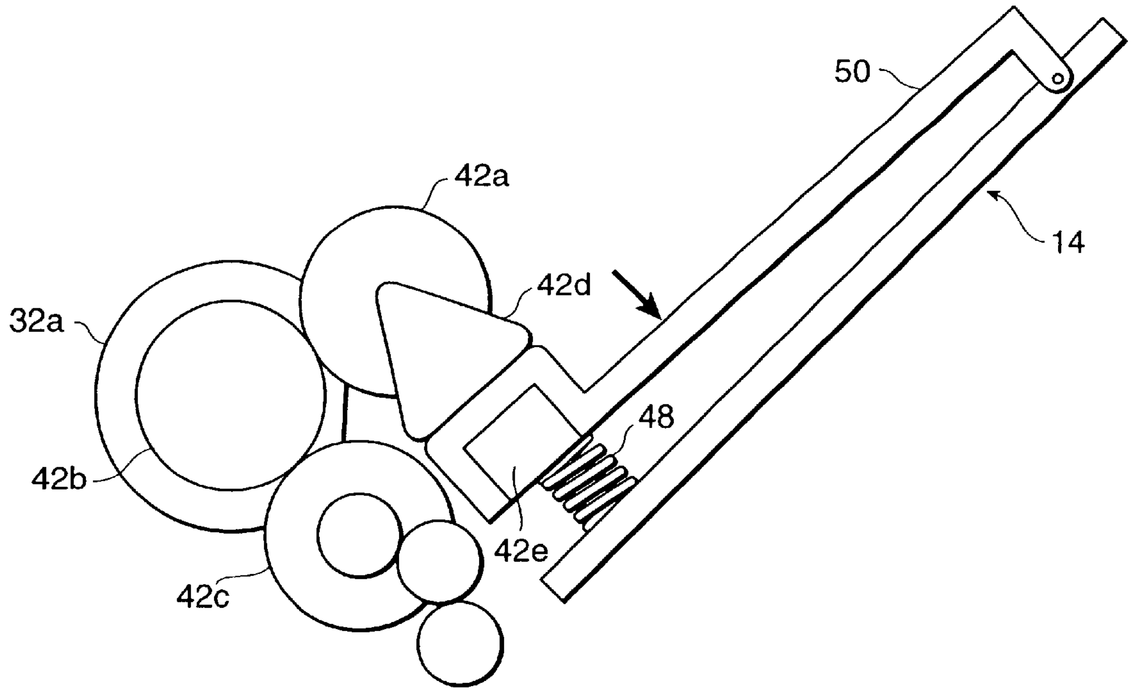
FIGS. 6A and 6B show a geartrain configuration for an automatic sheet feeder of the printer shown in FIG. 1.
Figure 6B:
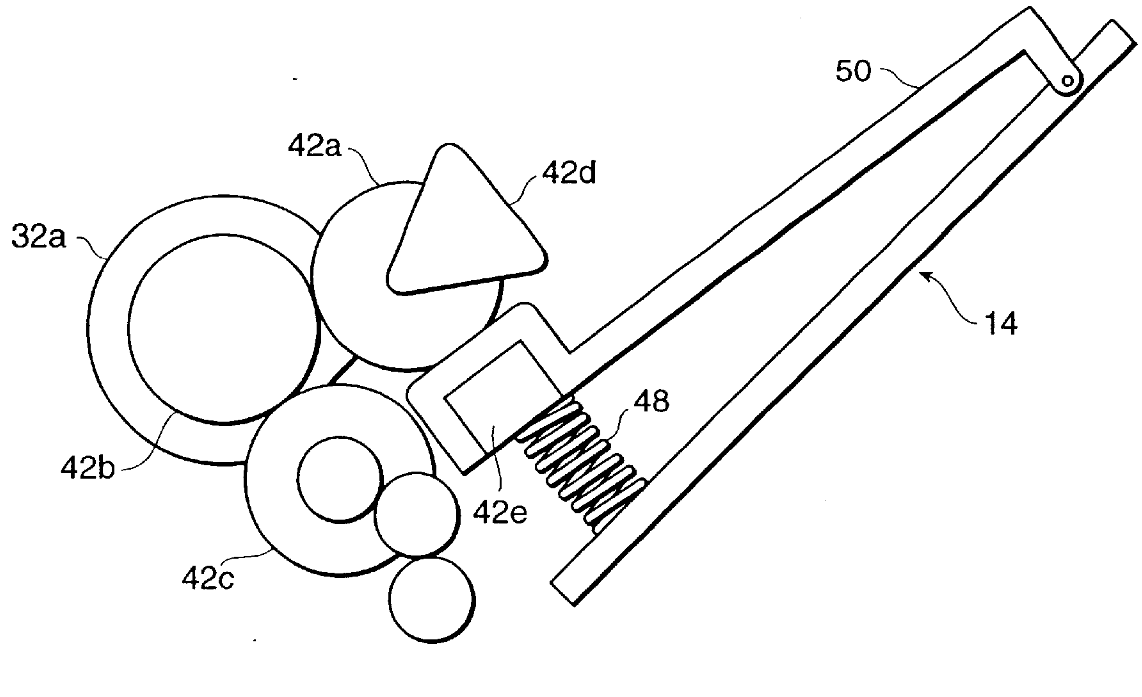

ASF gear train assembly 42 may appear as shown in FIGS. 6A and 6B. As shown in FIG. 6A, gear train assembly 42 comprises gears 42*a*, 42*b* and 42*c*. Gear 42*b* is attached to the end of ASF shaft 38 and turns the shaft when ASF motor 41 is engaged. Gear 42*a* engages gear 42*b* and includes a cam 42*d* that engages an ASF tray detent arm 42*e* of automatic feeder 14. As shown in FIG. 6A, when ASF shaft 38 is positioned at the home position, cam 42*d* presses against detent arm 42*e*. Automatic feeder 14 includes a pivotally mounted plate 50 that is biased by spring 48 so that when cam 42*d* engages detent arm 42*e*, automatic feeder 14 is depressed and when cam 42*d* disengages detent arm 42*e* (such as that shown in FIG. 6B), plate 50 is released. Depressing detent arm 42*e* causes the recording media stacked in automatic feeder 14 to move away from ASF rollers 32*a*, 32*b* and 32*c* and releasing detent arm 42*e* allows the recording to move close to the rollers so that the rollers can engage the recording medium when the ASF motor is engaged.

Returning to FIG. 4, printer 10 includes line feed motor 34 that is utilized for feeding the recording medium through printer 10 during printing operations. Line feed motor 34 drives line feed shaft 36, which includes line feed pinch rollers 36*a*, via line feed geartrain 40. The geartrain ratio for line feed geartrain 40 is set to advance the recording medium a set amount for each pulse of line feed motor 34. The ratio may be set so that one pulse of line feed motor 34 results in a line feed amount of the recording medium equal to a one pixel resolution advancement of the recording medium. That is, if one pixel resolution of the printout of printer 10 is 600 dpi (dots per inch), the geartrain ratio may be set so that one pulse of line feed motor 34 results in a 600 dpi advancement of the recording medium. Alternatively, the ratio may be set so that each pulse of the motor results in a line feed amount that is equal to a fractional portion of one pixel resolution rather than being a one-to-one ratio. Line feed motor 34 preferably comprises a 200-step, 2 phase pulse motor and is controlled in response to signal commands received from circuit board 35 of course, line feed motor 34 is not limited to a 200-step 2 phase pulse motor and any other type of line feed motor could be employed, including a DC motor with an encoder.

As shown in FIG. 5, printer 10 is a single cartridge printer which prints images using dual print heads, one having nozzles for printing black ink and the other having nozzles for printing cyan, magenta and yellow inks. Specifically, carriage 45 holds cartridge 28 that preferably accommodates ink tanks 43*a*, 43*b*, 43*c* and 43*d*, each containing a different colored ink. A more detailed description of cartridge 28 and ink tanks 43*a* to 43*d* is provided below with regard to FIG. 7. Carriage 45 is driven by carriage motor 39 in response to signal commands received from circuit board 35. Specifically, carriage motor 39 controls the motion of belt 25, which in turn provides for horizontal translation of carriage 45 along carriage guide shaft 51. In this regard, carriage motor 39 provides for bi-directional motion of belt 25, and thus of carriage 45. By virtue of this feature, printer 10 is able to perform bi-directional printing, i.e. print images from both left to right and right to left.

Printer 10 preferably includes recording medium cockling ribs 59. Ribs 59 induce a desired cockling pattern into the recording medium which the printer can compensate for by adjusting the firing frequency of the print head nozzles. Ribs 59 are spaced a set distance apart, depending upon the desired cockling shape. The distance between ribs 59 may be based on motor pulses of carriage motor 39. That is, ribs 59 may be positioned according to how many motor pulses of carriage motor 39 it takes for the print head to reach the location. For example, ribs 59 may be spaced in 132 pulse increments.

Printer 10 also preferably includes pre-fire receptacle areas 44*a*, 44*b* and 44*c*, wiper blade 46, and print head caps 47*a* and 47*b*. Receptacles 44*a* and 44*b* are located at a home position of carriage 45 and receptacle 44*c* is located outside of a printable area and opposite the home position. At desired times during printing operations, a print head pre-fire operation may be performed to eject a small amount of ink from the print heads into receptacles 44*a,* 44*b* and 44*c*. Wiper blade 46 is actuated to move with a forward and backward motion relative to the printer. When carriage 45 is moved to its home position, wiper blade 46 is actuated to move forward and aft so as to traverse across each of the print heads of cartridge 28, thereby wiping excess ink from the print heads. Print head caps 47*a* and 47*b* are actuated in a relative up and down motion to engage and disengage the print heads when carriage 45 is at its home position. Caps 47*a* and 47*b* are actuated by ASF motor 41 via a geartrain (not shown). Caps 47*a* and 47*b* are connected to a rotary pump 52 via tubes (not shown). Pump 52 is connected to line feed shaft 36 via a geartrain (not shown) and is actuated by running line feed motor 34 in a reverse direction. When caps 47*a* and 47*b* are actuated to engage the print heads, they form an airtight seal such that suction applied by pump 52 through the tubes and caps 47*a* and 47*b* sucks ink from the print head nozzles through the tubes and into a waste ink container (not shown). Caps 47*a* and 47*b* also protect the nozzles of the print heads from dust, dirt and debris.

Figure 7:
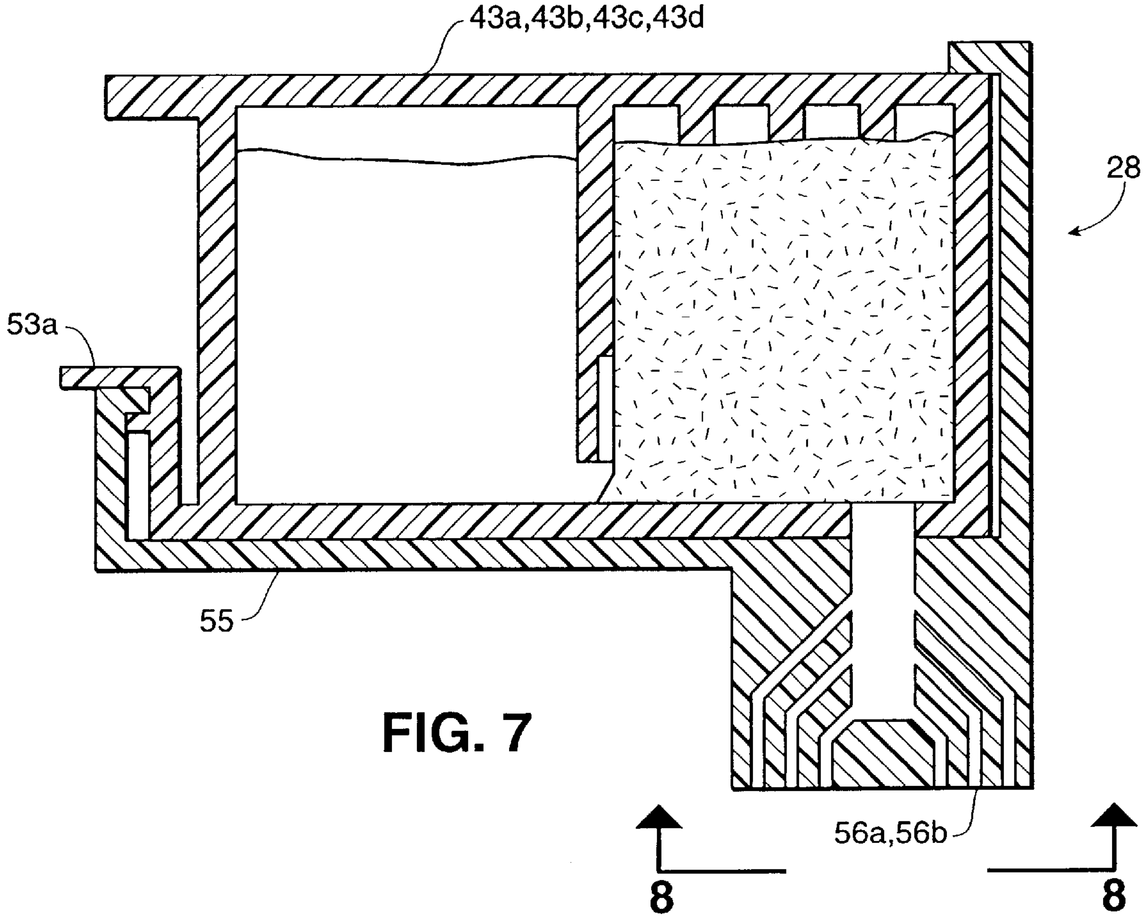
FIG. 7 is a cross-section view through a print cartridge and ink tank of the printer of FIG. 1.

FIG. 7 is a cross section view through one of the ink tanks installed in cartridge 28. Ink cartridge 28 includes cartridge housing 55, print heads 56*a* and 56*b,* and ink tanks 43*a,* 43*b,* 43*c* and 43*d.* Cartridge body 28 accommodates ink tanks 43*a* to 43*d* and includes ink flow paths for feeding ink from each of the ink tanks to either of print heads 56*a* or 56*b*. Ink tanks 43*a* to 43*d* are removable from cartridge 28 and store ink used by printer 10 to print images specifically, ink tanks 43*a* to 43*d* are inserted within cartridge 28 and can be removed by actuating retention tabs 53*a* to 53*d,* respectively. Ink tanks 43*a* to 43*d* can store color (e.g., cyan, magenta and yellow) ink and/or black ink. The structure of ink tanks 43*a* to 43*b* may be similar to that described in U.S. Pat. No. 5,509,140, or may be any other type of ink tank that can be installed in cartridge 28 to supply ink to print heads 56*a* and 56*b.*

Figure 8:
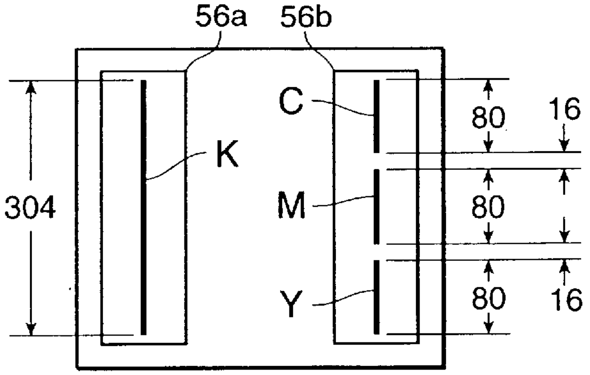
FIG. 8 is a plan view of a print head and nozzle configuration of the print cartridge of FIG. 7.

FIG. 8 depicts a nozzle configuration for each of print heads 56*a* and 56*b*. In FIG. 8, print head 56*a* is for printing black ink and print head 56*b* is for printing color ink. Print head 56*a* preferably includes 304 nozzles at a 600 dpi pitch spacing. Print head 56*b* preferably includes 80 nozzles at a 600 dpi pitch for printing cyan ink, 80 nozzles at a 600 dpi pitch for printing magenta ink, and 80 nozzles at a 600 dpi pitch for printing yellow ink. An empty space is provided between each set of nozzles in print head 56*b* corresponding to 16 nozzles spaced at a 600 dpi pitch. Each of print heads 56*a* and 56*b* eject ink based on commands received from a controller on circuit board 35.

Figure 9:
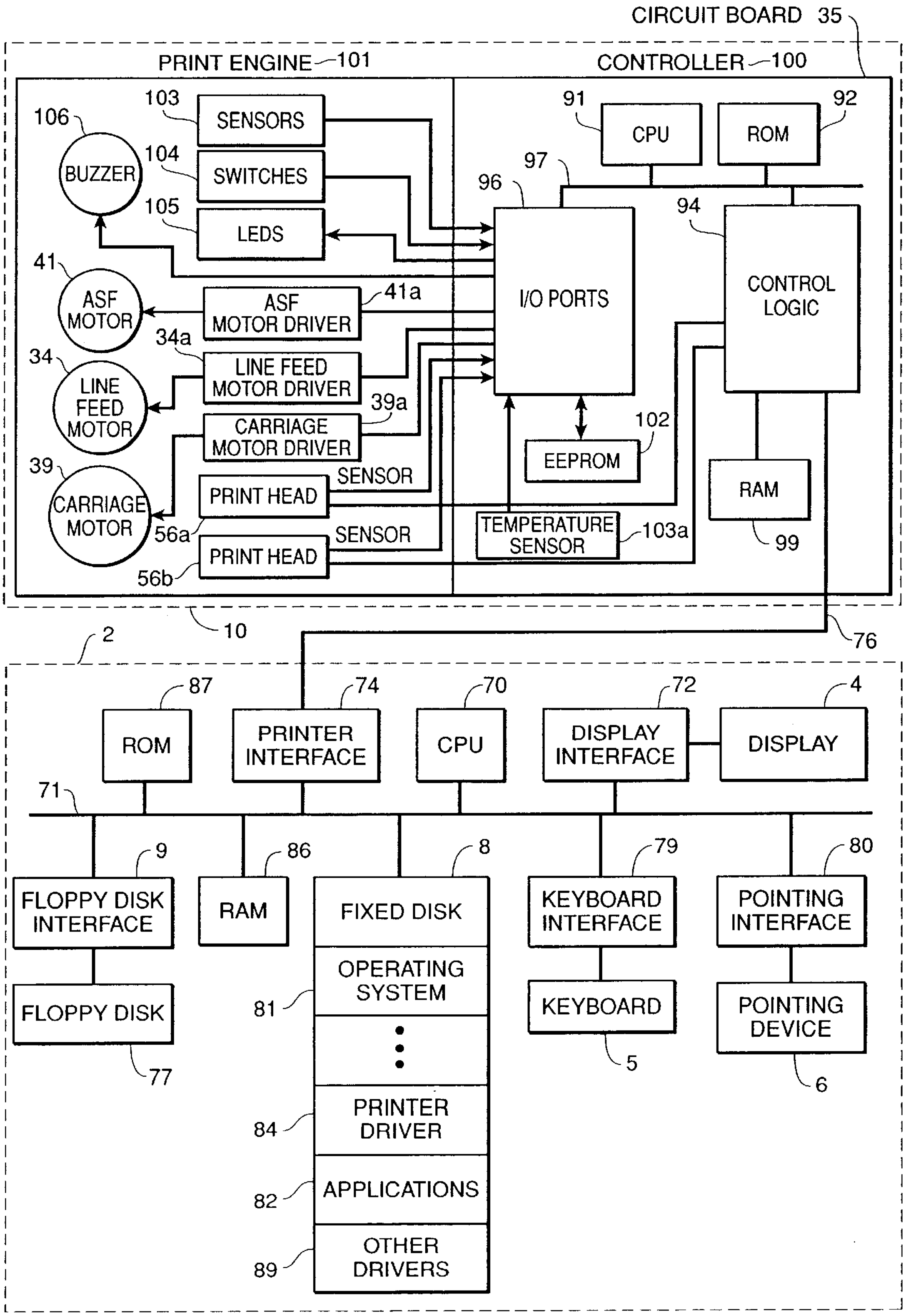
FIG. 9 is a block diagram showing the hardware configuration of a host processor interfaced to the printer of the present invention.

FIG. 9 is a block diagram showing the internal structures of host processor 2 and printer 10. In FIG. 9, host processor 2 includes a central processing unit 70 such as a programmable microprocessor interfaced to computer bus 71. Also coupled to computer bus 71 are display interface 72 for interfacing to display 4, printer interface 74 for interfacing to printer 10 through bi-directional communication line 76, floppy disk interface 9 for interfacing to floppy disk 77, keyboard interface 79 for interfacing to keyboard 5, and pointing device interface 80 for interfacing to pointing device 6. Disk 8 includes an operating system section for storing operating system 81, an applications section for storing applications 82, and a printer driver section for storing printer driver 84.

A random access main memory (hereinafter "RAM") 86 interfaces to computer bus 71 to provide CPU 70 with access to memory storage. In particular, when executing stored application program instruction sequences such as those associated with application programs stored in applications section 82 of disk 8, CPU 70 loads those application instruction sequences from disk 8 (or other storage media such as media accessed via a network or floppy disk interface 9) into random access memory (hereinafter "RAM") 86 and executes those stored program instruction sequences out of RAM 86. RAM 86 provides for a print data buffer used by printer driver 84. It should also be recognized that standard disk-swapping techniques available under the windowing operating system allow segments of memory, including the aforementioned print data buffer, to be swapped on and off of disk 8. Read only memory (hereinafter "ROM") 87 in host processor 2 stores invariant instruction sequences, such as start-up instruction sequences or basic input/output operating system (BIOS) sequences for operation of keyboard 5.

As shown in FIG. 9, and as previously mentioned, disk 8 stores program instruction sequences for a windowing operating system and for various application programs such as graphics application programs, drawing application programs, desktop publishing application programs, and the like. In addition, disk 8 also stores color image files such as might be displayed by display 4 or printed by printer 10 under control of a designated application program. Disk 8 also stores a color monitor driver in other drivers section 89 which controls how multi-level RGB color primary values are provided to display interface 72. Printer driver 84 controls printer 10 for both black and color printing and supplies print data for print out according to the configuration of printer 10. Print data is transferred to printer 10, and control signals are exchanged between host processor 2 and printer 10, through printer interface 74 connected to line 76 under control of printer driver 84. Printer interface 74 and line 76 may be, for example an IEEE 1284 parallel port and cable or a universal serial bus port and cable. Other device drivers are also stored on disk 8, for providing appropriate signals to various devices, such as network devices, facsimile devices, and the like, connected to host processor 2.

Ordinarily, application programs and drivers stored on disk 8 first need to be installed by the user onto disk 8 from other computer-readable media on which those programs and drivers are initially stored. For example, it is customary for a user to purchase a floppy disk, or other computer-readable media such as CD-ROM, on which a copy of a printer driver is stored. The user would then install the printer driver onto disk 8 through well-known techniques by which the printer driver is copied onto disk 8. At the same time, it is also possible for the user, via a modem interface (not shown) or via a network (not shown), to download a printer driver, such as by downloading from a file server or from a computerized bulletin board.

Referring again to FIG. 9, printer 10 includes a circuit board 35 which essentially contain two sections, controller 100 and print engine 101. Controller 100 includes CPU 91 such as an 8-bit or a 16-bit microprocessor including programmable timer and interrupt controller, ROM 92, control logic 94, and I/O ports unit 96 connected to bus 97. Also connected to control logic 94 is RAM 99. Control logic 94 includes controllers for line feed motor 34, for print image buffer storage in RAM 99, for heat pulse generation, and for head data. Control logic 94 also provides control signals for nozzles in print heads 56*a* and 56*b* of print engine 101, carriage motor 39, ASF motor 41, line feed motor 34, and print data for print heads 56*a* and 56*b.* EEPROM 102 is connected to I/O ports unit 96 to provide non-volatile memory for printer information and also stores parameters that identify the printer, the driver, the print heads, the status of ink in the cartridges, etc., which are sent to printer driver 84 of host processor 2 to inform host processor 2 of the operational parameters of printer 10.

I/O ports unit 96 is coupled to print engine 101 in which a pair of print heads 56*a* and 56*b* perform recording on a recording medium by scanning across the recording medium while printing using print data from a print buffer in RAM 99. Control logic 94 is also coupled to printer interface 74 of host processor 2 via communication line 76 for exchange of control signals and to receive print data and print data addresses. ROM 92 stores font data, program instruction sequences used to control printer 10, and other invariant data for printer operation. RAM 99 stores print data in a print buffer defined by printer driver 84 for print heads 56*a* and 56*b* and other information for printer operation.

Sensors, generally indicated as 103, are arranged in print engine 101 to detect printer status and to measure temperature and other quantities that affect printing. A photo sensor (e.g., an automatic alignment sensor) measures print density and dot locations for automatic alignment. Sensors 103 are also arranged in print engine 101 to detect other conditions such as the open or closed status of access door 12, presence of recording media, etc. In addition, diode sensors, including a thermistor, are located in print heads 56*a* and 56*b* to measure print head temperature, which is transmitted to I/O ports unit 96.

I/O ports unit 96 also receives input from switches 104 such as power button 26 and resume button 24 and delivers control signals to LEDs 105 to light indicator light 23, to line feed motor 34 ASF motor 41 and carriage motor 39 through line feed motor driver 34*a,* ASF motor driver 41*a* and carriage motor driver 39*a,* respectively.

Although FIG. 9 shows individual components of printer 10 as separate and distinct from one another, it is preferable that some of the components be combined. For example, control logic 94 may be combined with I/O ports 96 in an ASIC to simplify interconnections for the functions of printer 10.

Figure 10:
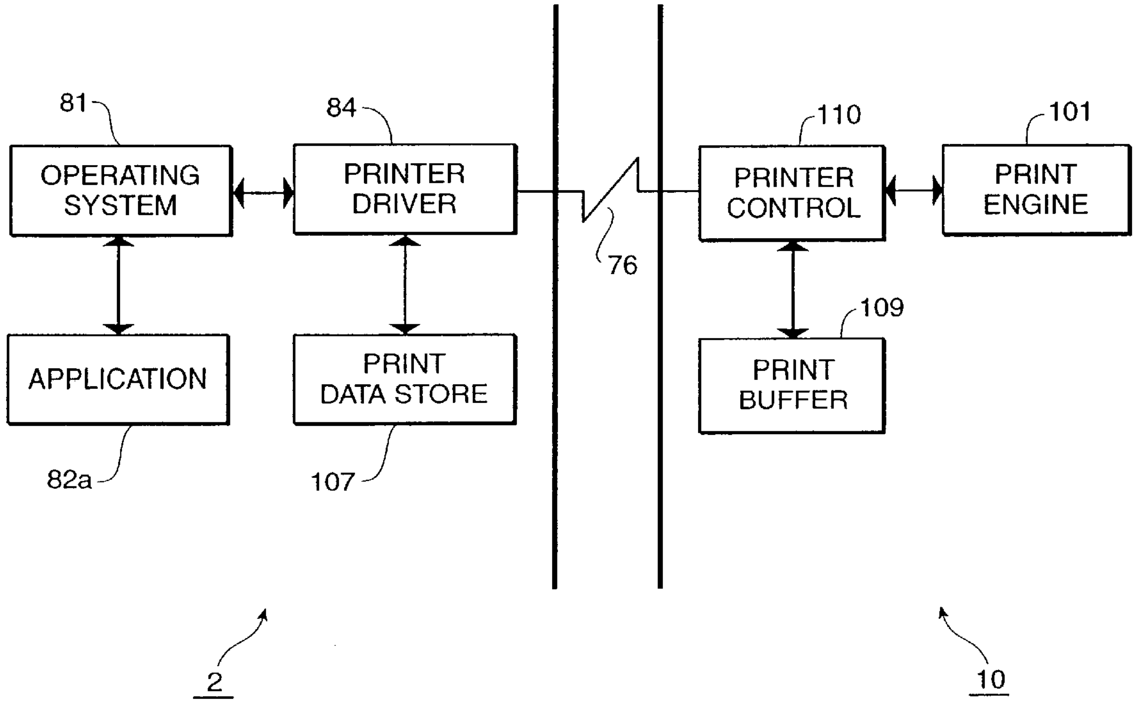
FIG. 10 shows a functional block diagram of the host processor and printer shown in FIG. 8.

FIG. 10 shows a high-level functional block diagram that illustrates the interaction between host processor 2 and printer 10. As illustrated in FIG. 10, when a print instruction is issued from image processing application program 82*a* stored in application section 82 of disk 8, operating system 81 issues graphics device interface calls to printer driver 84. Printer driver 84 responds by generating print data corresponding to the print instruction and stores the print data in print data store 107. Print data store 107 may reside in RAM 86 or in disk 8, or through disk swapping operations of operating system 81 may initially be stored in RAM 86 and swapped in and out of disk 8. Thereafter, printer driver 84 obtains print data from print data store 107 and transmits the print data through printer interface 74, to bi-directional communication line 76, and to print buffer 109 through printer control 110. Print buffer 109 resides in RAM 99, and printer control 110 resides in firmware implemented through control logic 94 and CPU 91 of FIG. 9. Printer control 110 processes the print data in print buffer 109 responsive to commands received from host processor 2 and performs printing tasks under control of instructions stored in ROM 92 (see FIG. 9) to provide appropriate print head and other control signals to print engine 101 for recording images onto recording media.

Print buffer 109 has a first section for storing print data to be printed by one of print heads 56*a* and 56*b,* and a second section for storing print data to be printed by the other one of print heads 56*a* and 56*b.* Each print buffer section has storage locations corresponding to the number of print positions of the associated print head. These storage locations are defined by printer driver 84 according to a resolution selected for printing. Each print buffer section also includes additional storage locations for transfer of print data during ramp-up of print heads 56*a* and 56*b* to printing speed. Print data is transferred from print data store 107 in host processor 2 to storage locations of print buffer 109 that are addressed by printer driver 84. As a result, print data for a next scan may be inserted into vacant storage locations in print buffer 109 both during ramp up and during printing of a current scan.

Figure 11:
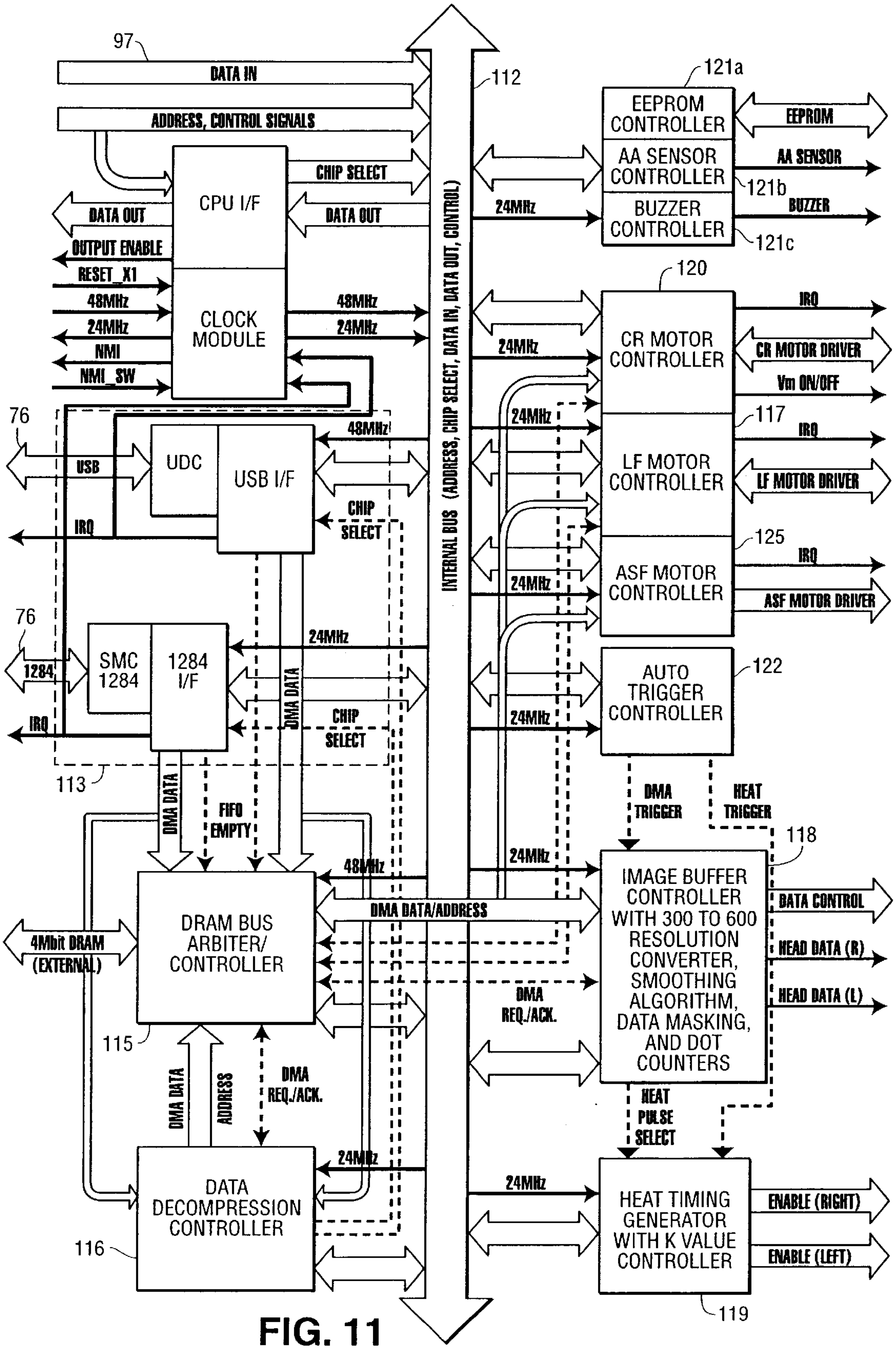
FIG. 11 is a block diagram showing the internal configuration of the gate array shown in FIG. 9.

FIG. 11 depicts a block diagram of a combined configuration for control logic 94 and I/O ports unit 96, which as mentioned above, I/O ports unit 96 may be included within control logic 94. In FIG. 11, internal bus 112 is connected to printer bus 97 for communication with printer CPU 91. Bus 112 is coupled to host computer interface 113 (shown in dashed lines) which is connected to bi-directional line 76 for carrying out bi-directional communication. As shown in FIG. 11, bi-directional line 76 may be either an IEEE-1284 line or a USB line. Bi-directional communication line 76 is also coupled to printer interface 74 of host processor 2. Host computer interface 113 includes both IEEE-1284 and USB interfaces, both of which are connected to bus 112 and to DRAM bus arbiter/controller 115 for controlling RAM 99 which includes print buffer 109 (see FIGS. 9 and 10). Data decompressor 116 is connected to bus 112, DRAM bus arbiter/controller 115 and each of the IEEE-1284 and USB interfaces of host computer interface 113 to decompress print data when processing. Also coupled to bus 112 are line feed motor controller 117 that is connected to line feed motor driver 34*a* of FIG. 9, image buffer controller 118 which provides serial control signals and head data signals for each of print heads 56*a* and 56*b,* heat timing generator 119 which provides block control signals and analog heat pulses for each of print heads 56*a* and 56*b,* carriage motor controller 120 that is connected to carriage motor driver 39*a* of FIG. 9, and ASF motor controller 125 that is connected to ASF motor driver 41*a* of FIG. 9. Additionally, EEPROM controller 121*a,* automatic alignment sensor controller 121*b* and buzzer controller 121 are connected to bus 112 for controlling EEPROM 102, an automatic alignment sensor (generally represented within sensors 103 of FIG. 9), and buzzer 106. Further, auto trigger controller 122 is connected to bus 112 and provides signals to image buffer controller 118 and heat timing generator 119, for controlling the firing of the nozzles of print heads 56*a* and 56*b.*

Control logic 94 operates to receive commands from host processor 2 for use in CPU 91, and to send printer status and other response signals to host processor 2 through host computer interface 113 and bi-directional communication line 76. Print data and print buffer memory addresses for print data received from host processor 2 are sent to print buffer 109 in RAM 99 via DRAM bus arbiter/controller 115, and the addressed print data from print buffer 109 is transferred through controller 115 to print engine 101 for printing by print heads 56*a* and 56*b.* In this regard, heat timing generator 119 generates analog heat pulses required for printing the print data.

Figure 12:
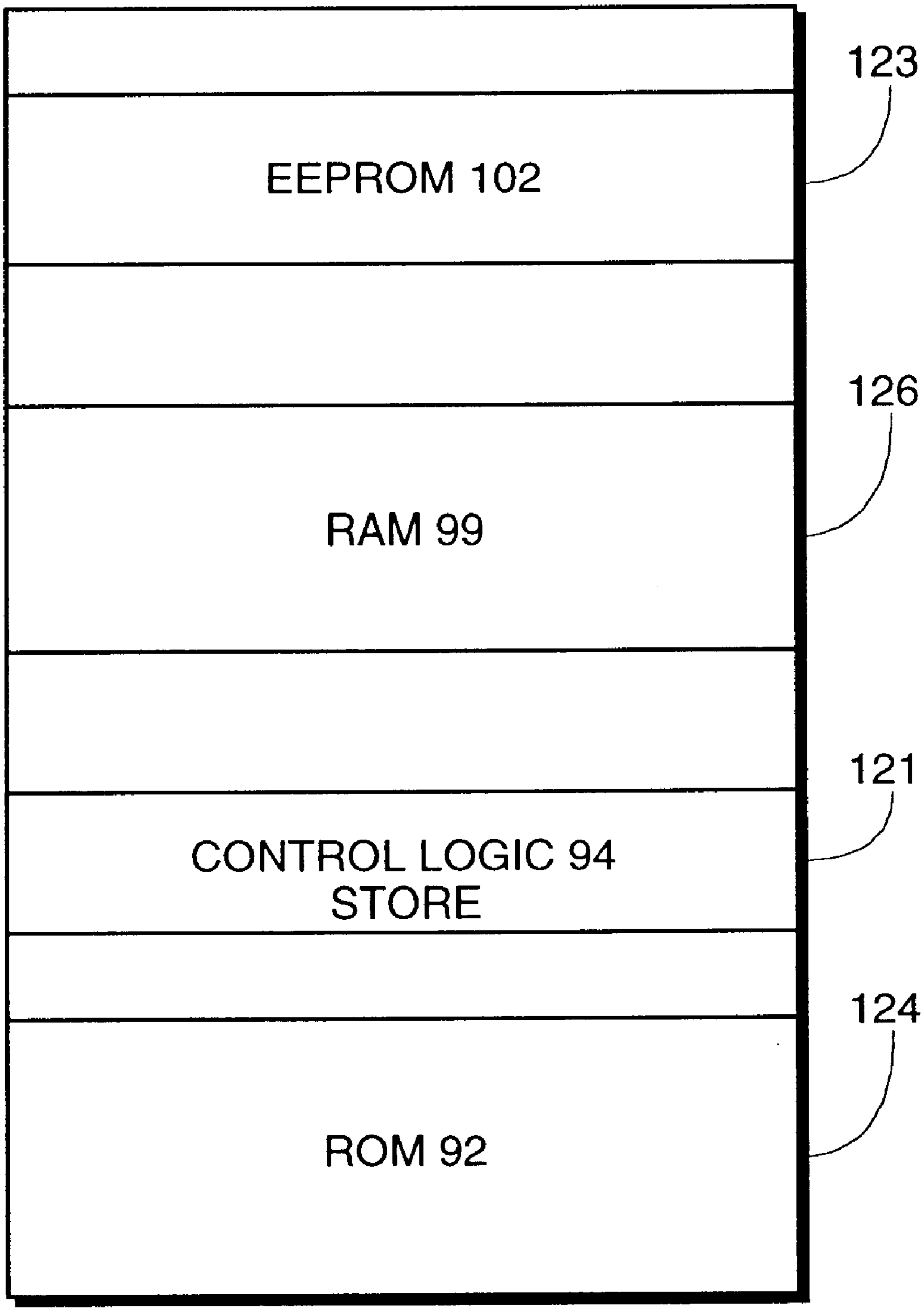
FIG. 12 shows the memory architecture of the printer of the present invention.

FIG. 12 shows the memory architecture for printer 10. As shown in FIG. 11, EEPROM 102, RAM 99, ROM 92 and temporary storage 121 for control logic 94 form a memory structure with a single addressing arrangement. Referring to FIG. 11, EEPROM 102, shown as non-volatile memory section 123, stores a set of parameters that are used by host processor 2 and that identify printer and print heads, print head status, print head alignment, and other print head characteristics. EEPROM 102 also stores another set of parameters, such as clean time, auto-alignment sensor data, etc., which are used by printer 10. ROM 92, shown as memory section 124, stores information for printer operation that is invariant, such as program sequences for printer tasks and print head operation temperature tables that are used to control the generation of nozzle heat pulses, etc. A random access memory section 121 stores temporary operational information for control logic 94, and memory section 126 corresponding to RAM 99 includes storage for variable operational data for printer tasks and print buffer 109.

A more detailed description of an automatic sheet feeding process according to the invention will now be made with reference to FIGS. 13A to 16B.

Figure 13A:
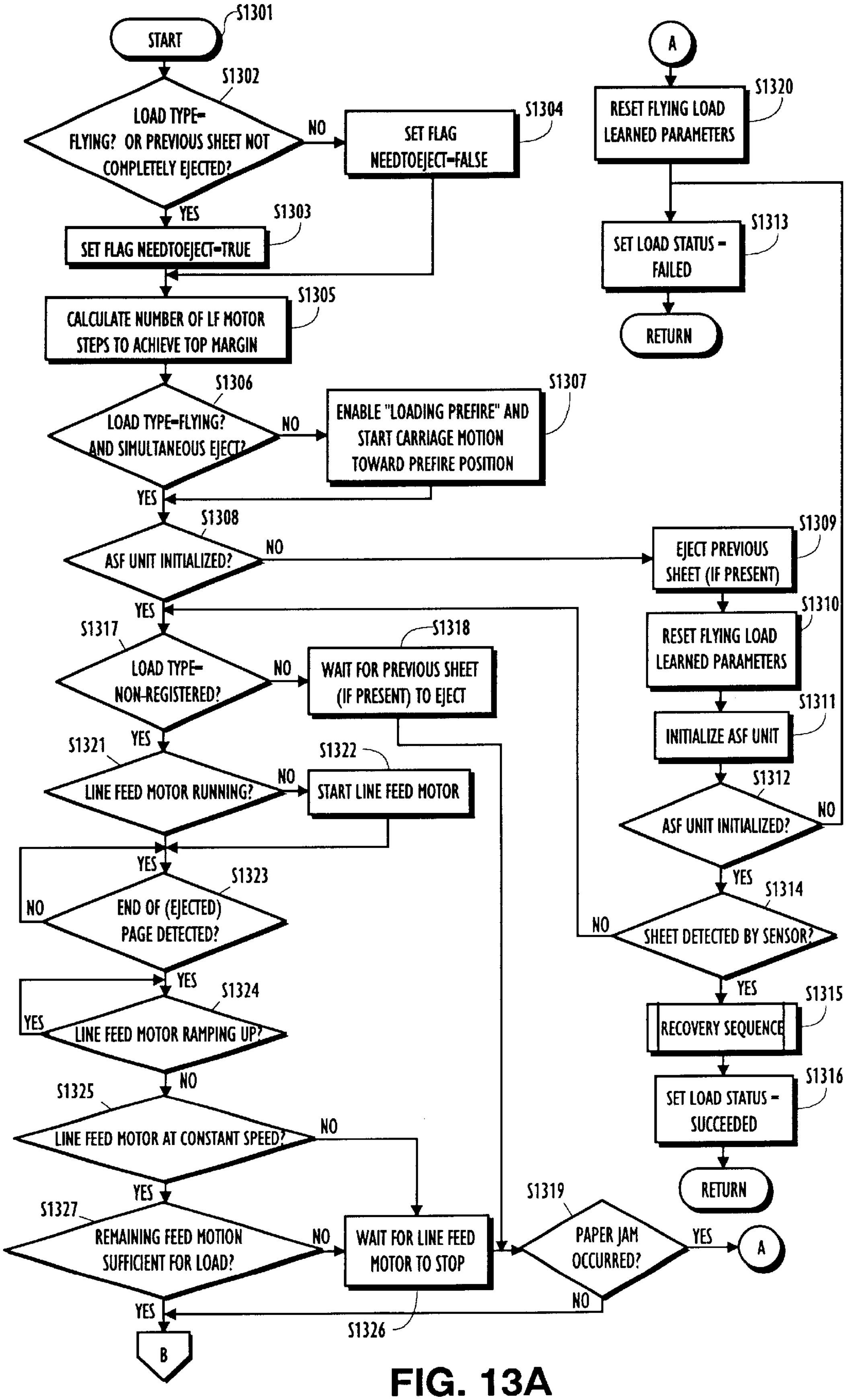
FIGS. 13A, 13B and 13C are flowcharts depicting process steps for performing an automatic sheet feeding operation according to the invention.
Figure 13B:
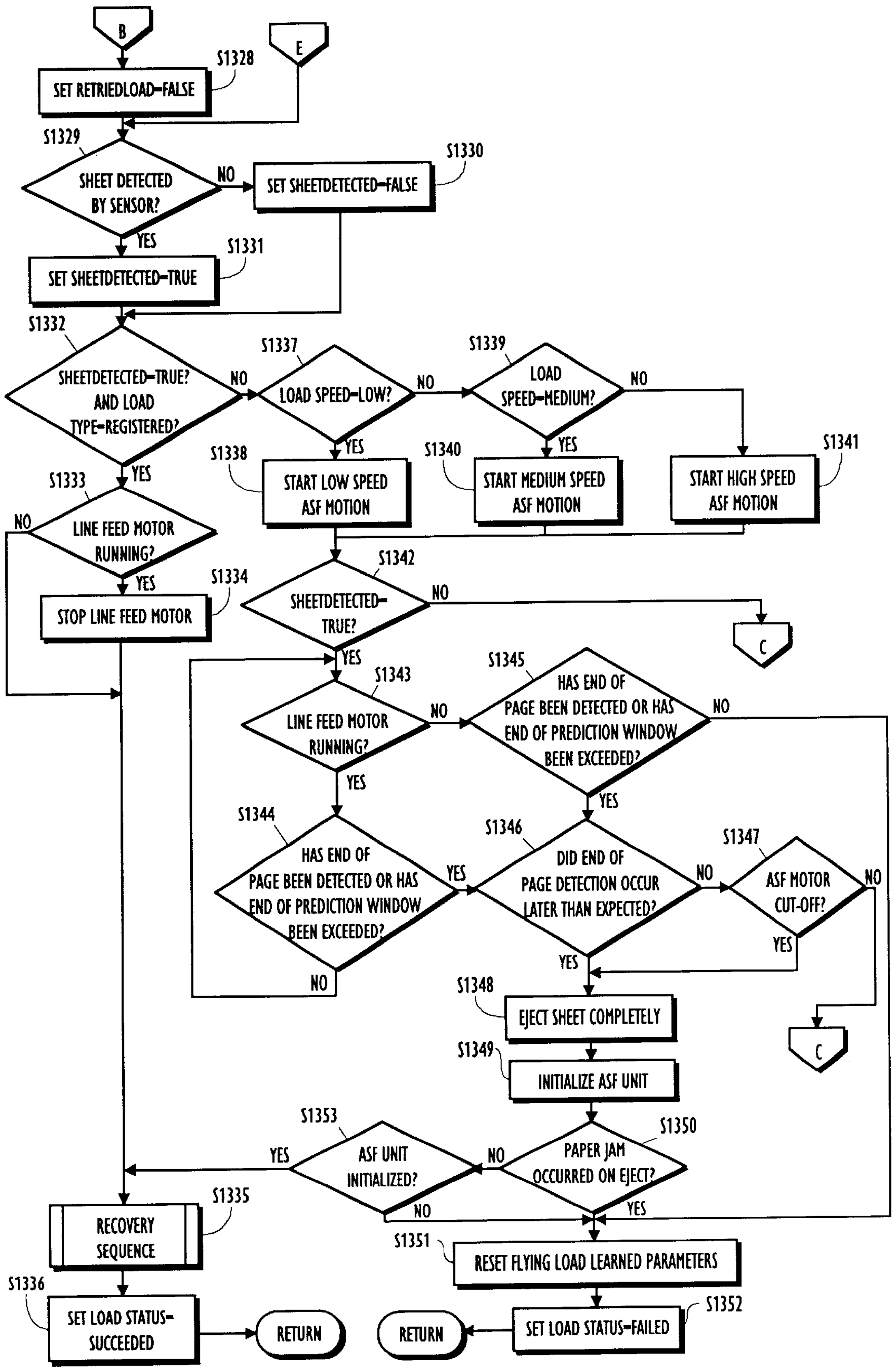
Figure 13C:
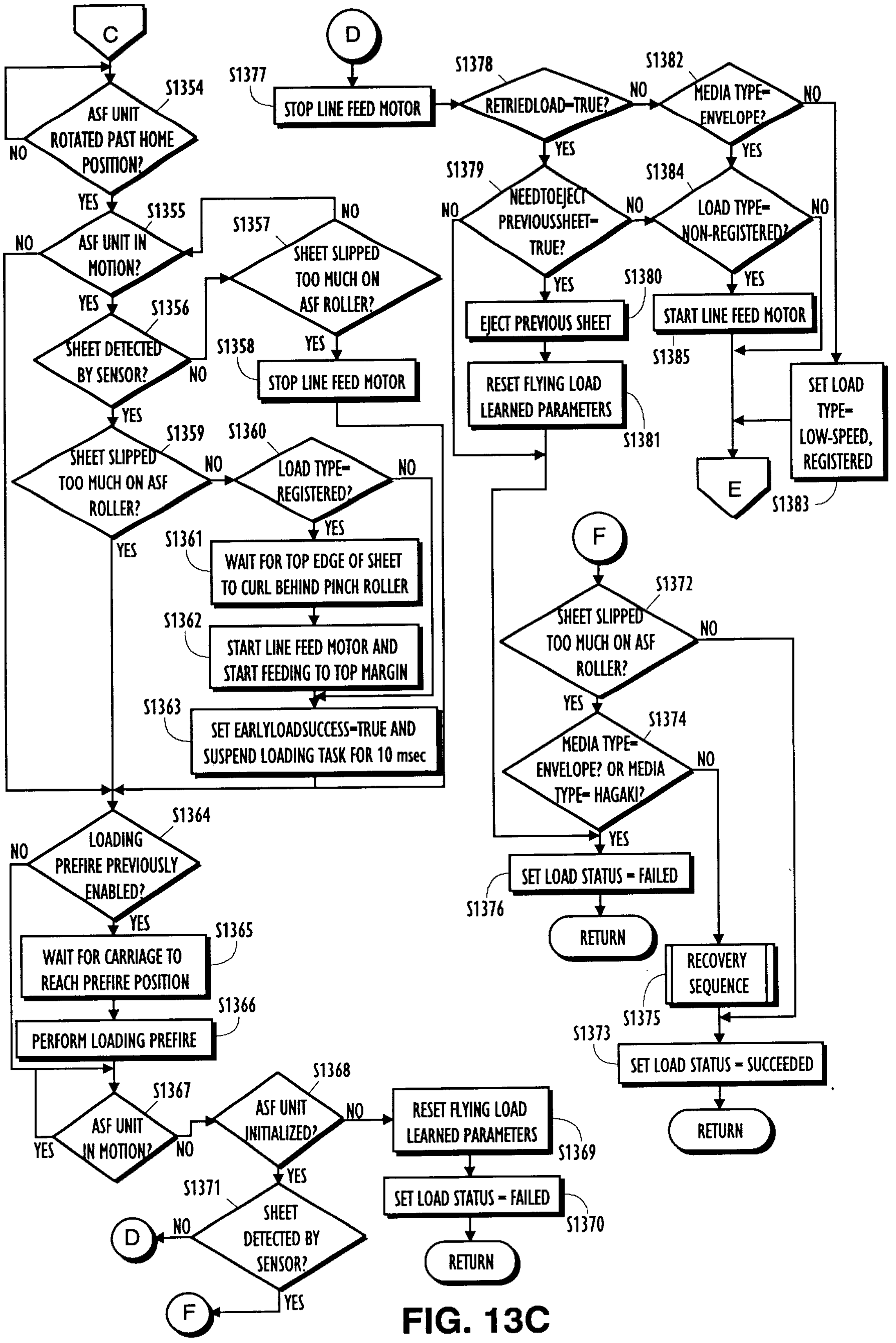

FIGS. 13A to 13C are flowcharts of an automatic sheet feeding operation according to the invention. It should be noted that the process steps, which start with step 1301 in FIG. 13A, could begin either with the feeding of a first sheet during printing, or during the feeding of any successive sheet during printing of a multi-page print job.

In step S1302, a determination is made whether the load type is flying or if the previous sheet has not been completely ejected. Flying load means a non-registered load with page end detection and refers to the loading type of the invention. This is in contrast to a regular non-registered load which means a non-registered load without page end detection. If the load type is flying, or if the previous sheet needs to be completely ejected, then in step S1303 a flag for the parameter NeedToEject is set to TRUE. If the load type is not flying and if the previous sheet has been completely ejected, then the flag NeedToEject is set to FALSE in step S1304. This flag is used in later processing as will be described below.

In step S1305, the number of steps (motor pulses) of the line feed motor to achieve the top of the printing margin are calculated. This step refers to printing without registration. Registration means the prior art process of registering the sheet against the line feed rollers to somewhat wrinkle the sheet and then the line feed motor being engaged to pick up the sheet and feed it through the printer. In this prior art process, the leading edge of the paper is "registered" against the line feed rollers before the line feed motor is engaged. In the present invention, however, there is no registration for flying load. That is, the paper is fed to the line feed rollers while the line feed rollers are already in motion. Therefore, step S1305 calculates the number of line feed motor steps for the sheet to achieve the top of the printing margin.

Step S1306 determines whether the load type is flying and if a simultaneous ejection is required. If not, then in step S1307 a loading prefire is enabled and the carriage is moved to the prefire position. The loading prefire is a print head conditioning operation. If the load type is flying, and if a simultaneous eject is required, then flow proceeds to step S1308. It should be noted that if the process steps are being applied to a first sheet being fed into the printer, then step S1306 has no meaning since there can be no simultaneous ejection of a previous sheet because there is no previous sheet to eject. Therefore, flow would automatically go to step S1307 for a first sheet.

In step S1308, a determination is made whether the ASF unit is initialized. Initialized means being at the home position. As stated above, the ASF unit is at the home position when the ASF initialization sensors 37*b* detect that ASF initialization sensor tab 37*a* is at the home position (i.e. breaking the light beam between the sensors). If the ASF unit is not initialized, which is not the nominal case, then flow proceeds to step S1309. In step S1309, the previous sheet (if one is present) is ejected and in step S1310, the learned flying load parameters are reset. Flying load parameters refer to parameters calculated and determined throughout the process steps. For instance, the process performs operations to actually detect the end of page of a current sheet and to calculate an expected end of page for the next sheet. These are just some of the learned parameters and in step S1310, these and other parameters that have been learned by previous passes through the processing steps are reset.

After the learned parameters are reset, the ASF unit is initialized, i.e. moved to the home position, in step S1311 and a determination is made in step S1312 whether the ASF unit is initialized. If the ASF unit is still not initialized, then a Load Status flag is set to FAILED in step S1313. If the ASF unit has been initialized, then flow proceeds to step S1314 where a determination is made whether the sheet has been detected by the PE sensor. Detecting the sheet by the PE sensor provides an indication of whether the paper has been partially fed by the ASF rollers during the re-initialization process of step S1311. If the sheet has been detected, then a recovery sequence is entered into in step S1315 and the Load Status flag is set to SUCCEEDED in step S1316. If the PE sensor has not detected the sheet in step S1314, or if the ASF unit was initialized in step S1308, then flow proceeds to step S1317. It should be noted that the nominal case is that the ASF unit would be initialized in step S1308 and flow would proceed directly to step S1317.

In step S1317, a determination is made whether the load type is non-registered. A non-registered load type may occur in one of two ways, flying load or a regular non-registered loading. As stated above, flying load is a non-registered load with page end detection, whereas, a regular non-registered load is a non-registered load without page end detection. If the load type is neither of the two types of non-registered load, i.e. it is a registered load, then flow proceeds to step S1318. In step S1318, the process waits for the previous sheet (if present) to eject and then a determination is made whether a paper jam occurred (step S1319). If a paper jam did not occur, then flow proceeds to step S1328 in FIG. 13B. However, if a paper jam did occur, then flow proceeds to steps S1320 and S1313 where the learned flying load parameters are reset and the Load Status is set to FAILED. Nominally, for the flying load case, the load type in step S1317 would be non-registered (flying) and flow would proceed to step S1321.

In step S1321, a determination is made whether the line feed motor is running, i.e. whether the line feed pinch rollers are up to speed. If the line feed motor is not running, then it is started in step S1322. Determining whether the line feed motor is running prevents the ASF motor from feeding paper into the line feed rollers when they are not running, which would cause a paper jam in a flying load case. Nominally, the line feed motor would be running and flow would proceed to step S1323 where a determination is made whether the end of the ejected page has been detected. The determination in step S1323 is a logical determination if the load type is flying and a physical determination if the load type is not flying but is a non-registered load. The process of a logical end of page detection is discussed in more detail with regard to FIG. 15. If the end of the ejected page has not been detected (either logically or physically), the process remains in a loop to wait for the end of the ejected page to be detected, and once the end has been detected, flow proceeds to step S1324.

In step S1324, a determination is made whether the line feed motor is ramping up and if so, the process remains in a loop until the line feed motor has been ramped up to speed. The determination in step S1324 is to determine whether the line feed motor rollers are running at the same speed as the ASF rollers so that the paper can be fed without causing a paper jam. Once the line feed motor has ramped up to speed, a determination is made in step S1325 whether the line feed motor has reached a constant speed. If not, then flow proceeds to step S1326 where the process waits for the line feed motor to stop (the process assumes that the line feed motor is ramping down) and then determines whether a paper jam occurred (step S1319). If a paper jam has not occurred, then flow proceeds to step S1328 of FIG. 13B. If a paper jam has occurred, then flow proceeds to steps S1320 and S1313 where the learned flying load parameters are reset and the Load Status flag is set to FAILED. Nominally, however, the line feed motor will be at a constant speed in step S1325 and flow would proceed to step S1327.

In step S1327, a determination is made whether there is sufficient motion remaining for line feed motor to feed the paper. That is, it is determined whether the line feed motor has enough motor steps remaining to feed the paper to the top margin. If not, then flow proceeds to step S1326 where the process waits for the line feed motor to stop. If there is sufficient motion to feed the paper, then flow proceeds to step S1328 of FIG. 13B.

In step S1328, a RetriedLoad flag is set to FALSE. This flag is utilized later in the process when a second attempt to retry the paper loading is made. Next, in step S1329 a determination is made whether the PE sensor has detected the sheet. This is a physical detection and not a logical detection. If the sheet has not been detected, then a Sheet-Detected flag is set to FALSE in step S1330, and if the sheet has been detected in step S1329, then the SheetDetected flag is set to TRUE in step S1331.

In step S1332, a determination is made whether the SheetDetected flag has been set to TRUE and if the load type is registered. If both are true (i.e. the load type is registered and the sheet detected flag is TRUE), then flow proceeds to step S1333. In step S1333, a determination is made whether the line feed motor is running, and if so, it is stopped in step S1334. If it is determined in step S1333 that the line feed motor is not running, or after it has been stopped in step S1334, flow proceeds to steps S1335 and S1336 to perform a recovery process and to set the Load Status flag to Succeeded.

For flying load, the determination in step S1332 would be that the load type is non-registered (i.e. flying) and therefore flow would proceed to step S1337. In steps S1337 to S1341, a determination is made whether the load speed is low or medium, and if it is either, the ASF is started in the determined speed (i.e. either low speed or medium speed), and if the load speed is neither low nor medium, then the ASF is started in high speed. In steps S1337 to S1341, the ASF motion is started to begin feeding the next sheet.

Next, in step S1342, a determination is made whether the SheetDetected flag is TRUE. This step looks at the PE state prior to starting the ASF motion. If the SheetDetected flag is not TRUE, then flow proceeds to step S1354 of FIG. 13C. If the SheetDetected flag is TRUE, then flow proceeds to step S1343 to determine whether the line feed motor is still running. This determination determines whether the line feed motor is still running or if it has run out of a finite number of steps for feeding the next sheet. Nominally, for flying load the line feed motor will still be running and flow proceeds to step S1344. If the line feed motor is not running in step S1343, then flow proceeds to step S1345. In step S1345, a determination is made whether the end of the current page has been detected or if the end of the prediction window (time when the end of page detection has been predicted to occur, plus some tolerance) has been exceeded. If both of these have not occurred, then flow proceeds to steps S1351 and S1352 where the flying load learned parameters are reset and the Load Status is set to FAILED. If either the end of page has been detected or the end of the prediction window has been exceeded, then flow proceeds to step S1346.

Returning to step S1343, if it was determined that the line feed motor was still running, flow proceeds to step S1344, where, like step S1345, a determination is made whether the end of the current page has been detected or whether the end of the prediction window has been exceeded. If neither has occurred, then flow returns to step S1343 to determine whether the line feed motor is still running. If either has occurred, then, like step S1345, flow proceeds to step S1346.

In step S1346, a determination is made whether the end of page detection occurred later than expected. Nominally, for flying load the determination is no and flow proceeds to step S1347 to determine whether the ASF motor has been cut-off. If the ASF motor has not been cut-off, which is the nominal case for flying load, the flow proceeds to step S1354 of FIG. 13C. If either the end of page detection did occur later than expected in step S1346, or if the ASF motor has been cut-off in step S1347, then flow proceeds to step S1348 where the current sheet is completely ejected.

Following step S1348, the ASF unit is initialized (moved to the home position) in step S1349 and a determination is made in step S1350 whether a paper jam has occurred on ejection of the current sheet. If a paper jam has occurred, then the flying load learned parameters are reset and the Load Status is set to FAILED in steps S1351 and S1352. If a paper jam did not occur on eject, then a determination is made whether the ASF unit has been initialized (i.e. whether the ASF unit is at the home position) in step S1353. If the ASF has not been initialized, then flow proceeds to steps S1351 and S1352 to reset the learned flying load parameters and to set the Load Status to FAILED. If the ASF unit has been initialized, then flow proceeds to steps S1335 and S1336 to perform a recovery sequence and to set the Load Status to SUCCEEDED.

Turning to FIG. 13C, in step S1354 a determination is made whether the ASF unit has rotated past the home position, i.e. if the ASF unit has rotated to start feeding the next sheet. If not, a loop is entered into to continue the inquiry until the ASF unit has rotated past the home position. Once the ASF unit has rotated past the home position, a determination is made whether the ASF unit is in motion in step S1355. If the ASF unit is not in motion, then flow proceeds to step S1364, which will be described below. Nominally, the ASF would be in motion and flow would proceed to step S1356 where a determination is made whether the PE sensor has detected the sheet. Nominally, for flying load the sheet would be detected by the PE sensor and flow would proceed to step S1359. However, if the PE sensor has not detected the sheet in step S1356, then a determination is made whether the sheet slipped too much on the ASF roller (step S1357). This determination is made by detecting whether a predetermined number of ASF motor steps have been exceeded for the PE sensor to detect the sheet. If not, then flow returns to step S1355. If the paper has slipped too much, then flow proceeds to step S1358 where the line feed motor is stopped, and then on to step S1364.

As stated above, nominally the sheet would be detected by the PE sensor in step S1356 and flow would proceed to step S1359 where a determination is made whether the sheet has slipped too much on the ASF roller. Again, this determination is made as to whether a predetermined number of ASF motor steps have been exceeded to feed the paper to the PE sensor. If the sheet has slipped too much, then flow proceeds to step S1364. Nominally, the sheet would not have slipped too much and flow would proceed to step S1360 where a determination is made whether the load type is registered. If the load type is not registered (which is the nominal case for flying load), then flow proceeds to step S1363 where an EarlyLoadSuccess flag is set to TRUE and the loading task is suspended for 10 msec. If the load type is registered in step S1360, then the process waits for the top edge of the sheet to curl behind the line feed pinch rollers (step S1361) and then the line feed motor is started (step S1362) and the sheet is fed to the top margin. After step S1362, the EarlyLoadSuccess flag is set to TRUE and the loading task is suspended for 10 msec in step S1363.

Flow proceeds to step S1364 if either the ASF unit was not in motion in step S1355, the line feed motor was stopped in step S1358, the sheet slipped too much in step S1359, or after the EarlyLoadSuccess flag has been set in step S1363. In step S1364, a determination is made whether the loading prefire condition for the print heads was previously enabled. Recall that the loading prefire may have previously been enabled in step S1307. If the loading prefire was previously enabled in step S1307, then the process waits for the carriage to reach the prefire position (step S1365), performs the loading prefire operation (step S1366), and proceeds to step S1367. If the loading prefire was not previously enabled, then flow proceeds directly to step S1367.

In step S1367, a determination is made whether the ASF unit is in motion. If the ASF unit is in motion, then a loop is entered into until the ASF unit is no longer in motion, whereby flow proceeds to step S1368 to determine if the ASF unit is initialized (at the home position). If the ASF unit is not initialized, then the learned flying load parameters are reset and the Load Status is set to FAILED in steps S1369 and S1370. If the ASF unit is initialized, which is the nominal case, then a determination is made whether the sheet is detected by the PE sensor (step S1371). Nominally, the sheet would be detected and flow would proceed to step S1372 where a determination is made whether the sheet has slipped too much on the ASF roller. Nominally, it would not have slipped too much and the Load Status would be set to SUCCEEDED in step S1373. However, if the sheet did slip too much, then a determination is made whether the media type is envelope or Hagaki in step S1374. If the media type is either of these, then the Load Status is set to FAILED (step S1376). If the media type is neither of these, then a recovery sequence is entered into (step S1375) and the Load Status is set to SUCCEEDED (step S1373).

Returning to step S1371, if a determination is made that the sheet was not detected by the sensor, then the line feed motor is stopped in step S1377. Then, in step S1378 a determination is made whether the RetriedLoad flag has been set to TRUE. That is, if the load has previously failed, a first attempt to retry the load will occur which changes the RetriedLoad flag that was set to FALSE in step S1328 to TRUE. If a determination is made in step S1378 that the RetriedLoad flag is TRUE, then the present attempt to try to load the paper is a second retry. The process provides for two attempts to retry to load the paper. If the RetriedLoad flag is TRUE, then flow proceeds to step S1379 where a determination is made whether the NeedToEjectPreviousSheet flag is set to TRUE. If the RetriedLoad flag is not TRUE, then flow proceeds to step S1382 where a determination is made whether the media type is envelope. If the media type is not envelope, then the Load Type is set to Low Speed, Registered (step S1383) to override the registered mode and flow returns to step S1329 of FIG. 13B. If the media type is envelope, then a determination is made in step S1384 whether the load type is non-registered. If the load type is not non-registered, then flow proceeds to step S1329 of FIG. 13B. If the load type is non-registered, then the line feed motor is started in step S1385 and flow proceeds to step S1329 of FIG. 13B.

Returning to step S1379, if the NeedToEjectPreviousSheet flag is not TRUE, then the Load Status is set to FAILED in step S1376. If however, the NeedToEjectPreviousSheet is TRUE, then the previous sheet is ejected, the learned flying load parameters are reset and the Load Status is set to FAILED in steps S1380, S1381 and S1376, respectively.

Figure 14A:
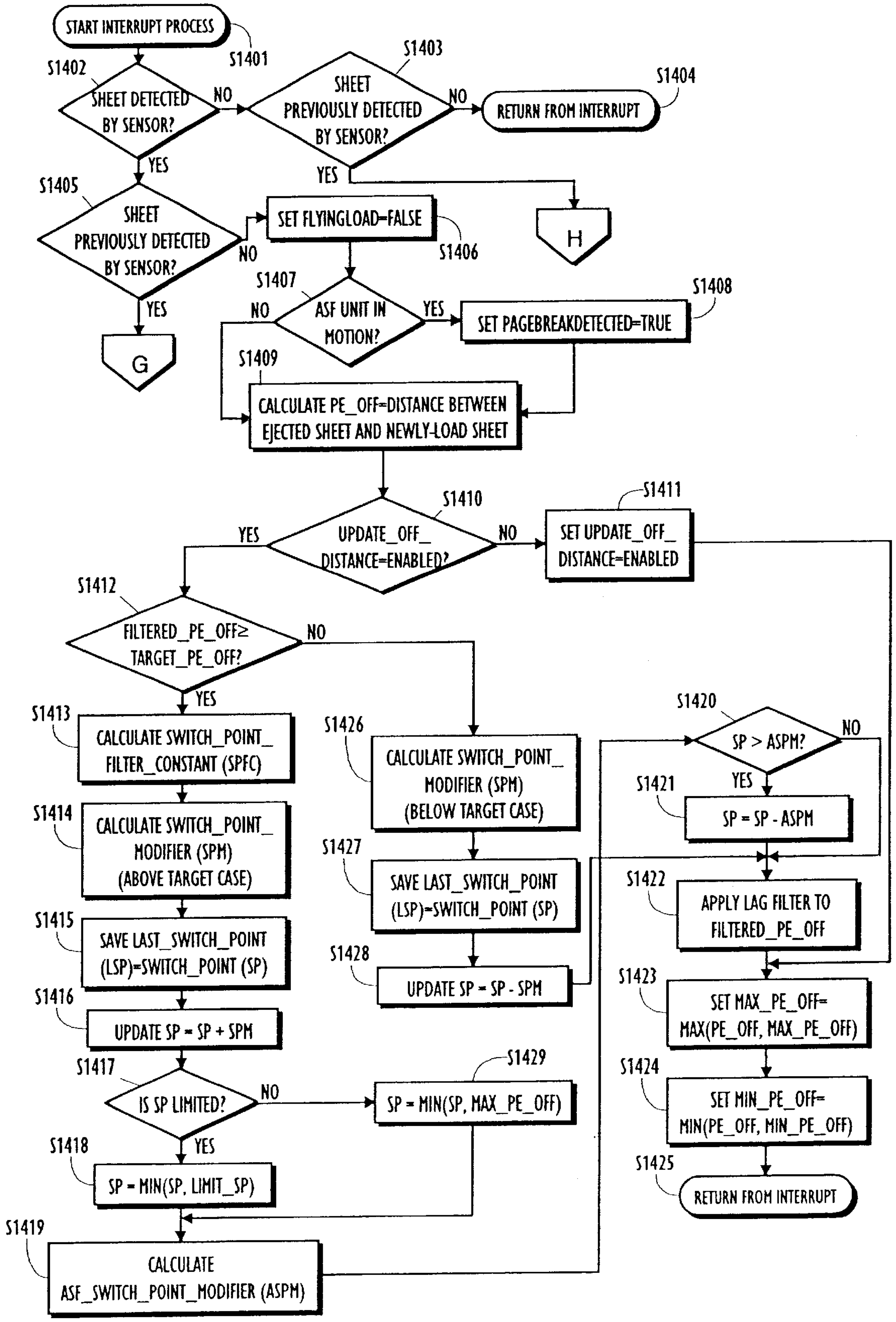
FIGS. 14A, 14B and 14C are flowcharts depicting process steps of a line feed motor interrupt process according to the invention.
Figure 14B:
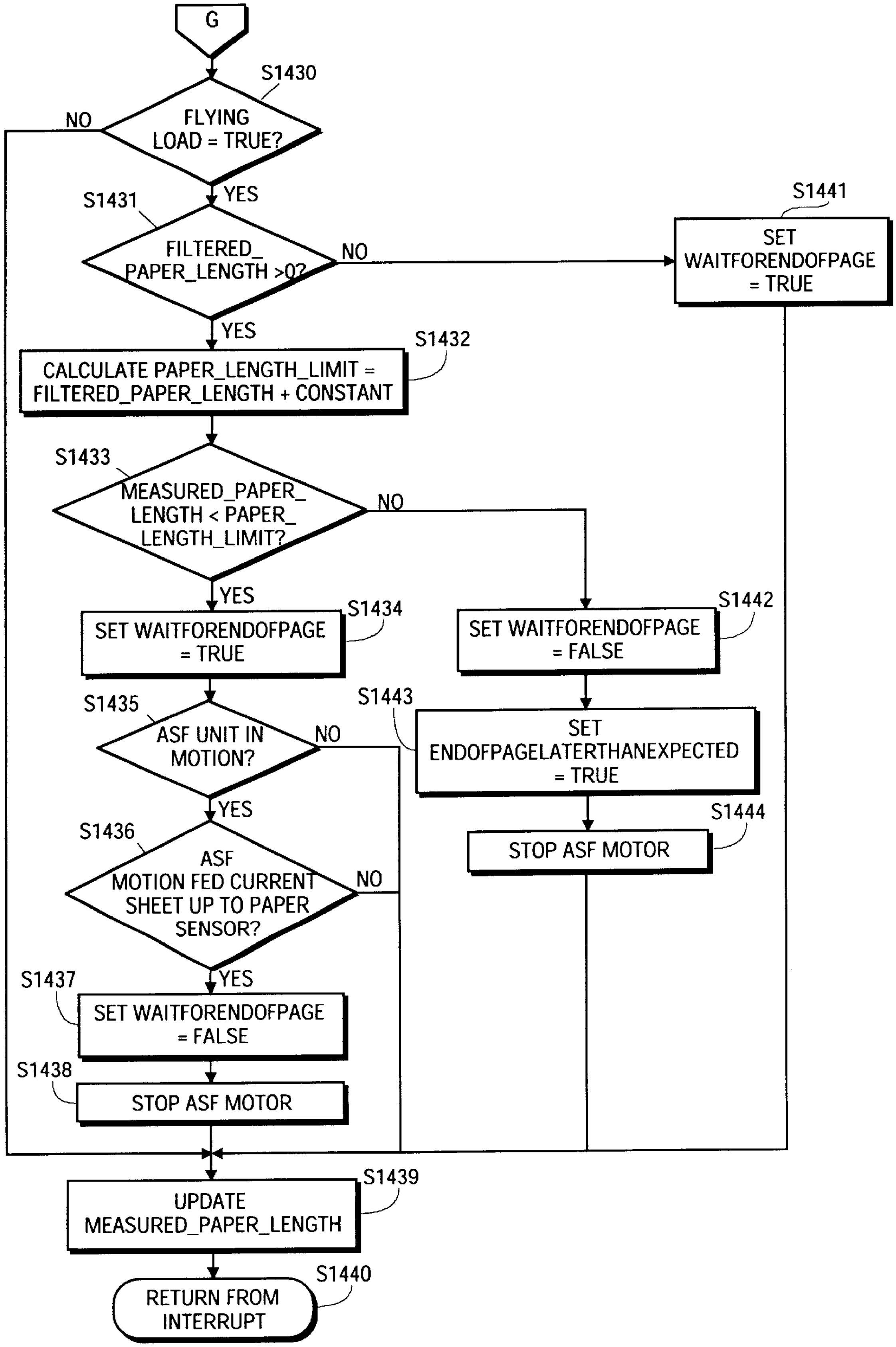
Figure 14C:
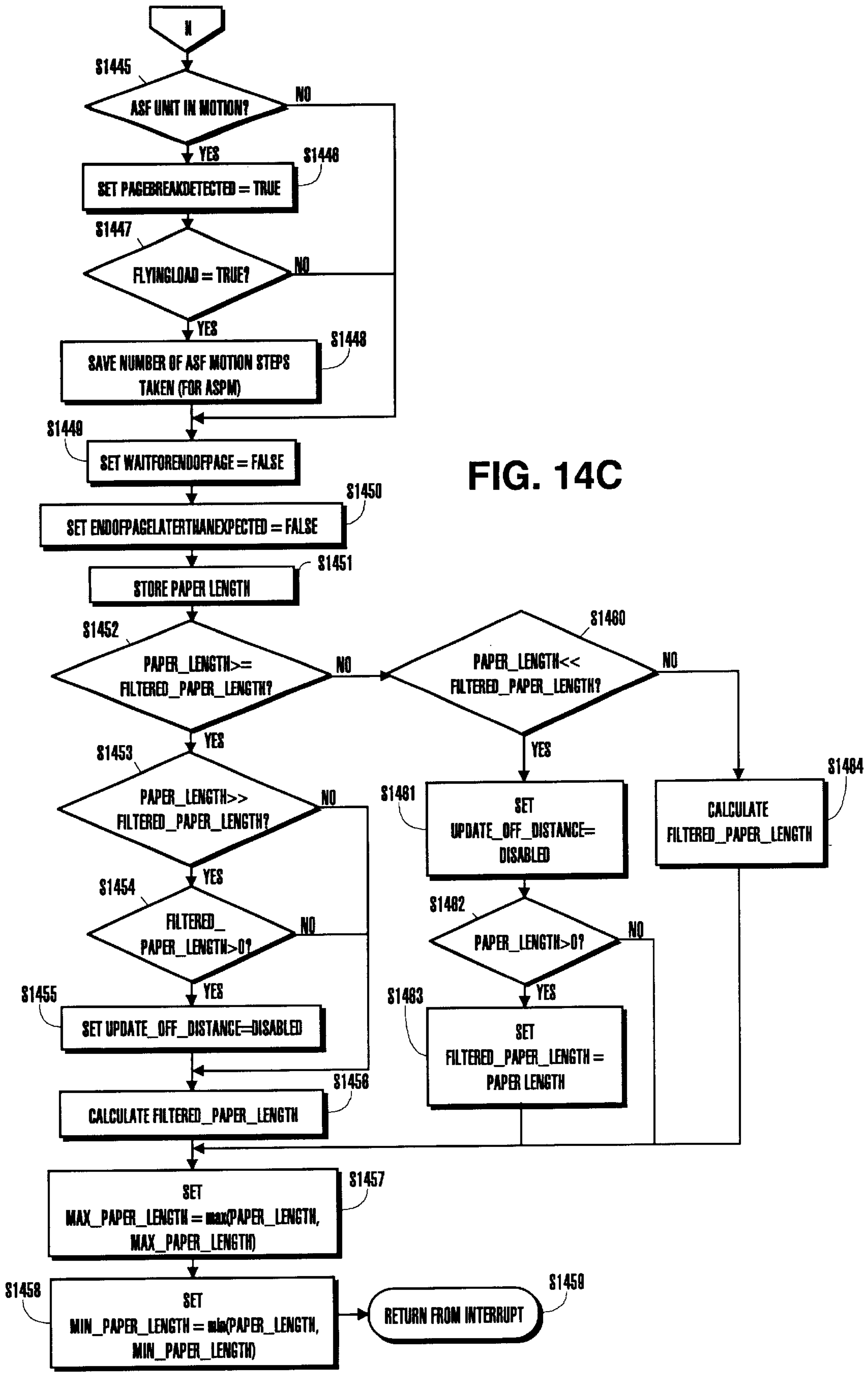

Thus, FIGS. 13A, 13B and 13C depict foreground process steps for performing a paper loading operation in printer 10 according to the invention. Part of the foreground process steps depicted in FIGS. 13A to 13C include background processes that are not depicted in these figures. One background process is a line feed motor interrupt process which is depicted in FIGS. 14A, 14B and 14C. This process translates line feed motor steps into paper length and calculates PE sensor off time between sheets. In the present invention, the background process is performed every four pulses of the line feed motor.

In FIG. 14A, the line feed motor interrupt process is begun in step S1401. In step S1402, a determination is made whether the current sheet is detected by the sensor. If the current sheet is not detected by the sensor, then a determination is made whether the sheet was previously detected by the sensor (step S1403). If the sheet was not previously detected by the sensor, then the interrupt process returns (step S1404). If the sheet was previously detected by the sensor, then flow proceeds to step S1445 in FIG. 14C. The flowchart of FIG. 14C represents a paper eject case, i.e. a case where the interrupt process is being performed when the current sheet is being ejected.

Returning to step S1402, if the current sheet is detected by the sensor, then a determination is made whether the sheet was previously detected by the sensor (step S1405). If the sheet was previously detected by the sensor, then this represents a case where the interrupt process is being performed in the middle of printing of the current sheet and flow proceeds to step S1430 of FIG. 14B. If the sheet was detected by the sensor in step S1402 but was not previously detected by the sensor in step S1405, then this represents a case where the interrupt process is being performed during loading of a next sheet and flow proceeds to step S1406.

In step S1406, the FlyingLoad flag is set to FALSE and in step S1407 a determination is made whether the ASF unit is in motion. If the ASF unit is in motion, then a PageBreakDetected flag is set to TRUE in step S1408 and flow proceeds to step S1409. If the ASF unit is not in motion, flow proceeds directly to step S1409.

In step S1409, the time that the PE sensor is off between sheets (PE_OFF) is calculated as the distance between the end to the ejected sheet and the newly-loaded sheet. Then, in step S1410 a determination is made whether the UPDATE_OFF_DISTANCE has been enabled.

UPDATE_OFF_DISTANCE provides the ability to update the PE_OFF time so that the feeding distance between sheets can be reduced and updated during the flying load process. If the UPDATE_OFF_DISTANCE has not been enabled, then it is enabled in step S1411 and flow proceeds to steps S1423, S1424 and S1425 where the upper limit of the target PE off time (MAX_PE_OFF) is set to the maximum of either the PE_OFF or the MAX_PE_OFF, the lower limit of the target PE off time (MIN_PE_OFF) is set to the minimum of the PE_OFF or the MIN_PE_OFF, and then the interrupt process returns (step S1425). Once the interrupt process returns, a new process is performed after four pulses of the line feed motor.

Returning to step S1410, if the UPDATE_OFF_DISTANCE has been enabled, then a determination is made whether the FILTERED_PE_OFF is greater than or equal to the TARGET_PE_OFF (step S1412). This step determines whether the current filtered PE off time is above or below the target PE off time. If the FILTERED_PE_OFF is not above the target, then this represents a case where the filtered PE off time is below the target and flow proceeds to step S1426. In step S1426, a SWITCH_POINT_MODIFIER (SPM) is calculated utilizing a switch point modifier algorithm. Then, in step S1427 the LAST_SWITCH_POINT_MODIFIER (LSPM) is saved as the switch point modifier calculated in step S1426. Next, the switch point (SP) is updated by subtracting the SPM calculated in step S1426 from the last SP (step S1428), and a lag filter is applied to the FILTERED_PE_OFF time in step S1422. Flow then proceeds to steps S1423, S1424 and S1425 to set the MAX_PE_OFF and MIN_PE_OFF values and to return from the interrupt process.

Returning to step S1412, if a determination is made that the FILTERED_PE_OFF is greater than or equal to the TARGET_PE_OFF, then this represents an above target case and flow proceeds to step S1413. In step S1413, a SWITCH_POINT_FILTER_CONSTANT (SPFC) is calculated utilizing a switch point filter constant algorithm. Then, similar to steps S1426 and S1427, the switch point modifier (SPM) is calculated and the last switch point (LSP) is set equal to the switch point (SP) (steps S1414 and S1415). Then, in step S1416, the switch point (SP) is updated by adding the last switch point (SP) with the switch point modifier (SPM) calculated in step S1414.

Flow then proceeds to step S1417 where a determination is made whether the switch point (SP) is limited. If the switch point (SP) is not limited, then in step S1429 the switch point (SP) is set to the minimum of the current switch point (SP) or the MAX_PE_OFF time. If however, the switch point is limited in step S1417, then in step S1418 the switch point (SP) is set to the minimum of the current switch point (SP) or the LIMIT_SP.

Flow then proceeds from either steps S1418 or S1429 to steps S1419 and S1420 where an ASF_SWITCH_POINT_MODIFIER (ASPM) is calculated utilizing an ASF switch point modifier algorithm (step S1419) and a determination is made whether the switch point (SP) is greater than the ASF switch point modifier (ASPM) (step S1420). IF the SP is greater than the ASF switch point modifier (ASPM), then the switch point (SP) is set to the current SP minus the value of the ASPM (step S1421) and flow proceeds to steps S1422, S1423, S1424 and S1425, which were discussed above. If the SP is not greater than the ASPM, then flow proceeds directly to steps S1422, S1423, S1424 and S1425.

Turning to FIG. 14B, a discussion will now be made of a case where the interrupt process is performed in the middle of the page case where flow proceeds from step S1405 of FIG. 14A to step S1430 of FIG. 14B. In FIG. 14B, after the determination has been made in step S1405 of FIG. 14A that the sheet was previously detected by the sensor, a determination is made whether the FlyingLoad has been set to TRUE (step S1430). If not, flow proceeds directly to step S1439 where the value MEASURED_PAPER_LENGTH is updated and then the interrupt process returns at step S1440. If FlyingLoad is TRUE, then a determination is made in step S1431 whether the FILTERED_PAPER_LENGTH is greater than zero. If the FILTERED_PAPER_LENGTH is not greater than zero, then the WaitForEndOfPage is set to TRUE (step S1441) and flow proceeds to steps S1439 and S1440 to update the MEASURED_PAPER_LENGTH and return from the interrupt process. If the FILTERED_PAPER_LENGTH is greater than zero, then flow proceeds to step S1432.

In step S1432, the PAPER_LENGTH_LIMIT is calculated to be the FILTERED_PAPER_LENGTH plus a constant. Then, in step S1433 a determination is made whether the MEASURED_PAPER_LENGTH is less than the PAPER_LENGTH_LIMIT. If it is not, then WaitForEndOfPage is set to FALSE (step S1442), EndOfPageLaterThanExpected is set to TRUE (step S1443) and the ASF motor is stopped (step S1444). Then, flow proceeds to steps S1439 and S1440 to update the MEASURED_PAPER_LENGTH and to return from the interrupt process.

If the MEASURED_PAPER_LENGTH is less than the PAPER_LENGTH_LIMIT in step S1433, then WaitForEndOfPage is set to TRUE in step S1434. Then, in step S1435, a determination is made whether the ASF unit is in motion, and if so, a determination is made whether the ASF motion has fed the current sheet up to the PE sensor (step S1436). If the ASF unit is not in motion in step S1435, or if the ASF unit has not fed the current sheet up to the PE sensor in step S1436, then flow proceeds directly to steps S1439 and S1440 to update the MEASURED_PAPER_LENGTH and return from the interrupt process. If however, the ASF motion has fed the current sheet up to the PE sensor, then WaitForEndOfPage is set to FALSE (step S1437) and the ASF motor is stopped (step S1438), with flow then proceeding to steps S1439 and S1440.

Next a discussion will be made of the eject case where flow proceeds from step S1403 of FIG. 14A to step S1445 of FIG. 14C.

In step S1445, a determination is made whether the ASF unit is in motion. If so, then PageBreakDetected is set to TRUE in step S1446, and if not, then flow proceeds to step S1449 (described below). After the PageBreakDetected is set to TRUE in step S1446, a determination is made whether FlyingLoad is TRUE (step S1447). If FlyingLoad is TRUE, then flow proceeds to steps S1448, S1449, S1450 and S1451 where the number of ASF motion steps taken are saved for the ASPM (see FIG. 14A), WaitForEndOfPage is set to FALSE, EndOfPageLaterThanExpected is set to FALSE, and the paper length is stored. Flow then proceeds to step S1452. If FlyingLoad is not TRUE in step S1447, then flow bypasses step S1448 and proceeds directly to step S1449.

In step S1452, a determination is made whether the PAPER_LENGTH is greater than or equal to the FILTERED_PAPER_LENGTH. If so, then another determination is made in step S1453 whether the PAPER_LENGTH is much greater than the FILTERED_PAPER_LENGTH. If the PAPER_LENGTH is much greater than the FILTERED_PAPER_LENGTH, then a determination is made in step S1454 whether the FILTERED_PAPER_

LENGTH is greater than zero. If the PAPER__LENGTH is not much greater than the FILTERED__PAPER__LENGTH in step S1453, flow advances to step S1456 which will be described below. Returning to step S1454, if the FILTERED__PAPER__LENGTH is not greater than zero, flow advances to step S1456. However, if the FILTERED__PAPER__LENGTH is greater than zero, then the UPDATE__OFF__DISTANCE is disabled in step S1455 and then flow proceeds to step S1456.

If the result of step S1453 is no, the result of step S1454 is no, or if the result of step S1454 is yes and the UPDATE__OFF__DISTANCE has been disabled in step S1455, then the FILTERED__PAPER__LENGTH is calculated in step S1456. After step S1456, the MAX__PAPER__LENGTH is set to the maximum of the PAPER__LENGTH or the MAX__PAPER__LENGTH (step S1457) and the MIN__PAPER__LENGTH is set to the minimum of the PAPER__LENGTH or the MIN__PAPER__LENGTH (step S1458), and the interrupt process returns (step S1459).

Returning to step S1452, if the PAPER__LENGTH is not greater than or equal to the FILTERED__PAPER__LENGTH, flow proceeds to step S1460 where a determination is made whether the PAPER__LENGTH is much less than the FILTERED__PAPER LENGTH. If the PAPER__LENGTH is not much less than the FILTERED__PAPER__LENGTH, then the FILTERED__PAPER__LENGTH is calculated in step S1464 and flow proceeds to steps S1457, S1458 and S1459 to set the MAX__PAPER__LENGTH and the MIN__PAPER__LENGTH, and then to return from the interrupt process. If however, the PAPER__LENGTH is much less than the FILTERED__PAPER__LENGTH, then the UPDATE__OFF__DISTANCE is disabled in step S1461 and flow proceeds to step S1462.

At step S1462, a determination is made whether the PAPER__LENGTH is greater than zero. If it is not, then flow proceeds directly to steps S1457, S1458 and S1459. If the PAPER__LENGTH is greater than zero, then the FILTERED__PAPER__LENGTH is set to be equal to the PAPER__LENGTH in step S1463, with flow then proceeding to steps S1457, S1458 and S1459.

Next, a discussion will be made of a logical end of page detection routine for performing a logical end of page detection such as that briefly described above with regard to step S1323 of FIG. 13A.

Figure 15:
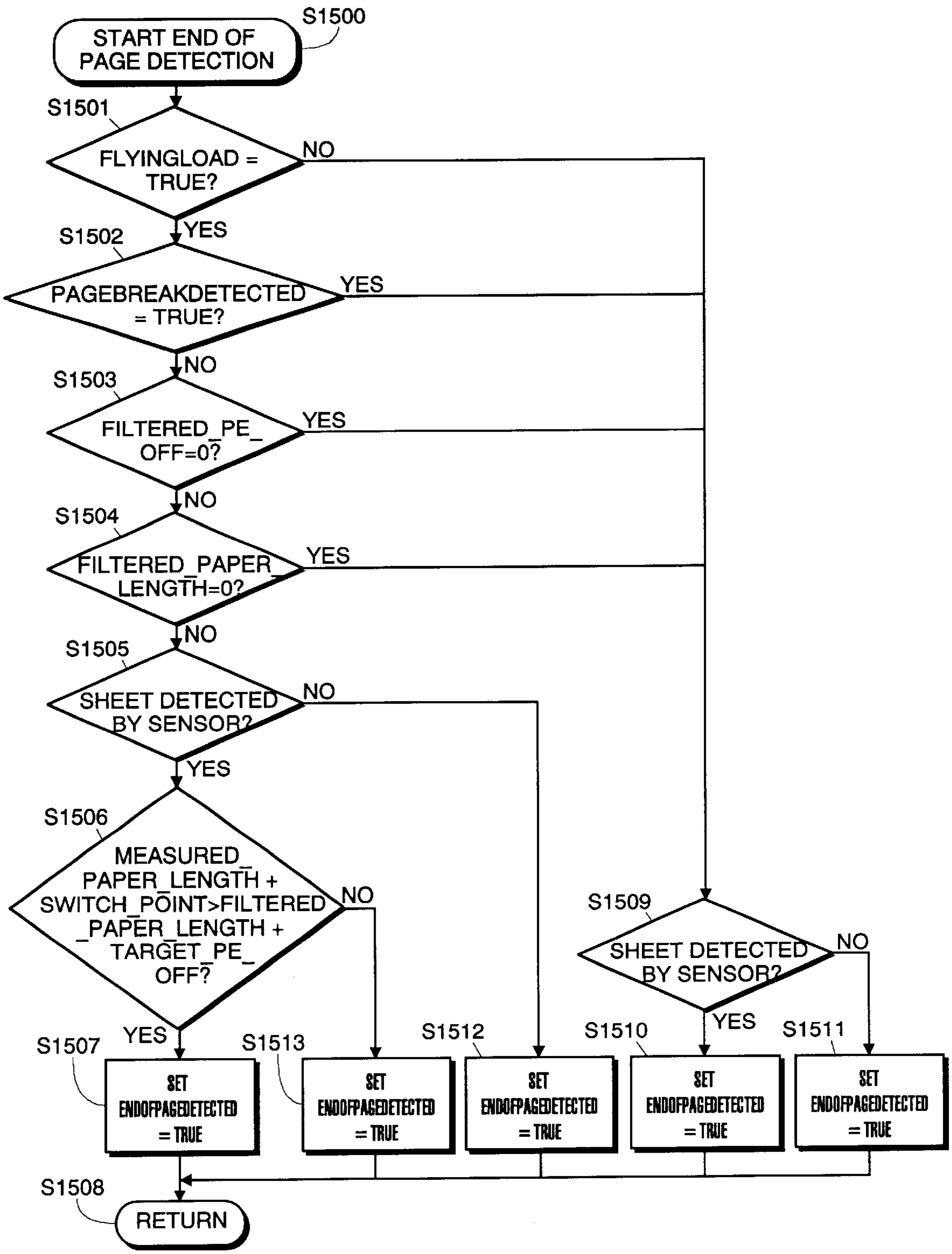
FIG. 15 is a flowchart depicting process steps for performing a logical end of page detection process according to the invention.

In FIG. 15, the logical end of page detection routine is started in step S1500 and in step S1501 a determination is made whether FlyingLoad is TRUE. If FlyingLoad is not TRUE, then flow proceeds to step S1509 which will be discussed below. If FlyingLoad is TRUE, then flow proceeds to step S1502 where a determination is made whether PageBreakDetected is TRUE. If it is TRUE, then flow proceeds to step S1509. If it is not TRUE, then flow proceeds to step S1503 where a determination is made whether the FILTERED__PE__OFF is equal to zero. If the FILTERED__PE__OFF is zero, then flow proceeds to steps S1509. If the FILTERED__PE__OFF is not zero, then flow proceeds to step S1504 where a determination is made whether the FILTERED__PAPER__LENGTH is equal to zero. If the FILTERED__PAPER__LENGTH is equal to zero, then flow proceeds to step S1509. If the FILTERED__PAPER__LENGTH is not equal to zero flow proceeds to step S1505.

As stated above, in each of steps S1501, S1502, S1503 and S1504, flow could proceed to step S1509. In step S1509, a determination is made whether the sheet has been detected by the sensor. If it has, then EndOfPageDetected is set to FALSE (step S1510), and if it has not been detected, then EndOfPageDetected is set to TRUE (step S1511). The logical end of page detection process then returns after either of steps S1510 or S1511.

Returning to step S1505, a determination is made whether the sheet has been detected by the sensor. If it has not been detected, then EndOfPageDetected is set to TRUE (step S1512) and the process returns (step S1508). If the sheet has been detected by the sensor, then a determination is made whether the MEASURED__PAPER__LENGTH plus the SWITCH__POINT is greater than the FILTERED__PAPER__LENGTH plus the TARGET__PE__OFF (step S1506). If the the MEASURED__PAPER__LENGTH plus the SWITCH__POINT is greater than the FILTERED__PAPER__LENGTH plus the TARGET__PE__OFF, then EndOfPageDetected is set to TRUE (step S1507) and the process returns (step S1508). If the the MEASURED__PAPER__LENGTH plus the SWITCH__POINT is not greater than the FILTERED__PAPER__LENGTH plus the TARGET__PE__OFF, then EndOfPageDetected is set to FALSE (step S1513) and the process returns (step S1508).

The foregoing process steps provide for a sheet feeding operation which performs flying load. The flying load operation begins feeding a next sheet prior to detection of the end of the current sheet, thereby reducing the distance between the sheets being fed into the printer. The process calculates the time when the end of the current sheet will be detected and updates variables to begin feeding the next sheet within a target feed time. That is, the process includes a target minimum distance between the end of the current sheet and the beginning of the next sheet in order to provide for a more optimum feeding operation. The process steps track the distance between the sheets during the feeding operation and adjusts the timing for feeding the next sheet so as to maintain the distance within a target range. Next, a discussion will be made regarding a relationship between ASF motor pulses and a sheet feed amount by the ASF, and a relationship between line feed motor pulses and a line feed sheet amount.

Figure 16A:
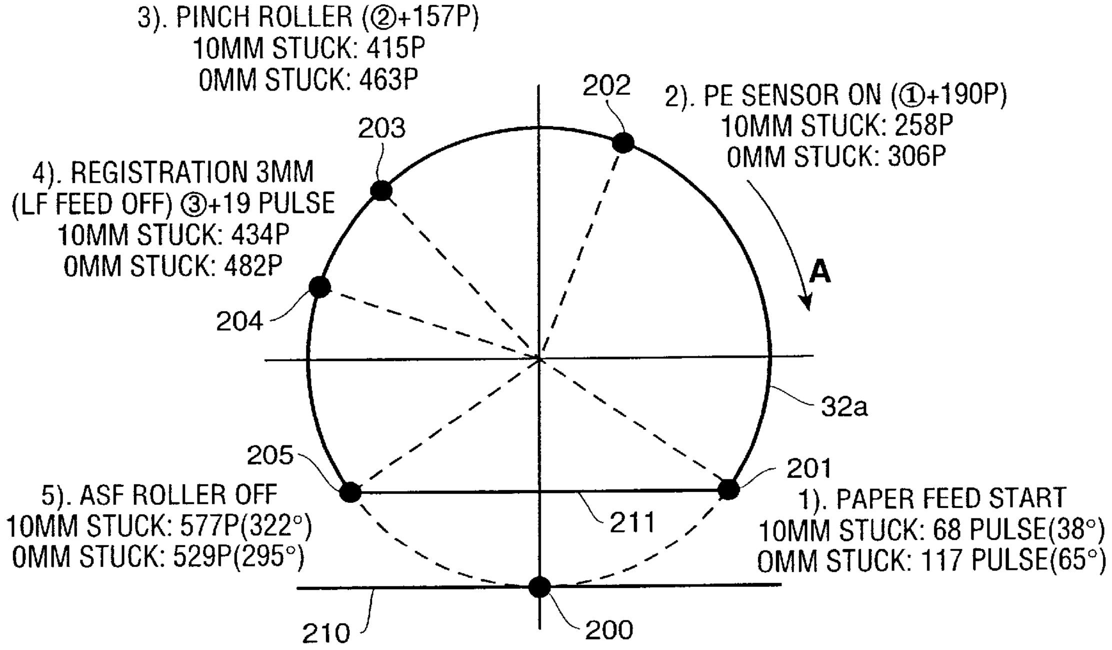
FIG. 16A depicts a relationship between ASF motor pulses and an ASF roller feed amount.

FIG. 16A depicts a relationship between ASF motor pulses and a corresponding sheet feed amount (in millimeters) by ASF roller 32*a*. In FIG. 16A, the ASF motor 41 is assumed to be a 2-2 phase motor, the ASF drivetrain is assumed to have a gear ratio of 1:13.4375, and the ASF roller 32*a* has a diameter of 31.6 mm. As such, one complete (360°) rotation of ASF roller 32*a* is assumed to take 645 motor pulses of the ASF motor and that one motor pulse corresponds to a 0.1539 mm feed amount of the ASF roller.

In FIG. 16A, ASF roller 32*a* is depicted at its home position (i.e. initialization position) and rotates in a clockwise direction as shown by arrow A. Reference number 210 represents one sheet of a recording medium that is to be picked up and fed by ASF roller 32*a*. Reference number 200 represents a point of contact between ASF roller 32*a* and recording medium 210.

As seen in FIG. 16A, ASF roller 32*a* includes a flat portion 211. When ASF roller 32*a* is positioned at the home position, flat portion 211 provides for disengagement of ASF roller 32*a* from recording medium 210. When the ASF motor is started, ASF roller 32*a* rotates clockwise from the home position. When ASF roller 32*a* has rotated so that point 201 along the circumference of ASF roller 32*a* rotates to point 200, ASF roller 32*a* engages recording medium 210. As seen in FIG. 16A, 68 pulses of the ASF motor are needed to rotate the ASF roller from point 201 to point 200. When the ASF roller has rotated to point 201, it begins feeding recording medium 210 into printer 10.

As the ASF motor continues to turn, ASF roller 32*a* also continues to rotate until point 202 rotates to point 200. When ASF roller 32*a* has rotated from point 202 to point 200, recording medium 210 engages the PE sensor and the PE sensor is turned on. As seen in FIG. 16A, 190 pulses of the ASF motor are needed to rotate ASF roller 32*a* from point 201 to point 202. Accordingly, 258 pulses (68 plus 190) are needed to rotate ASF roller 32*a* from the home position until the recording medium engages and turns on the PE sensor.

The ASF motor continues to turn and ASF roller 32*a* continues to feed recording medium 210 into printer 10 until recording medium 210 reaches line feed pinch rollers 36*a*. When recording medium 210 reaches line feed pinch rollers 36*a*, for flying load pinch rollers 36*a* are turning and they engage recording medium 210 to begin feeding it through printer 10. At this point, in a flying load case, both ASF roller 32*a* and line feed pinch rollers 36*a* are engaged with recording medium 210. Therefore, both ASF roller 32*a* and line feed pinch rollers 36*a* should be turning at the same rate. This was described above with reference to FIGS. 13A to 13C. As seen in FIG. 16A, 157 ASF motor pulses are needed to feed recording medium 210 from the time it turns on the PE sensor until it reaches line feed pinch rollers 36*a*. Accordingly, the total ASF motor pulses for ASF roller 32*a* to rotate from its home position and to feed recording medium 210 to line feed pinch rollers 36*a* is 415 (68+190+157).

If the load type is not a flying load, but is a registered load, then line feed pinch rollers 36*a* will not be turning when recording medium 210 reaches them. That is, the line feed motor is not engaged to turn line feed rollers 36*a* until after recording medium 210 has been registered. As seen in FIG. 16A, the ASF motor continues to turn to register recording medium 210 against line feed pinch rollers 36*a*. The registration amount is 3 mm as shown in FIG. 16A, and a 3 mm registration amount corresponds to 19 pulses of the ASF motor. Therefore, once recording medium 210 reaches line feed pinch rollers 36*a*, the ASF motor performs 19 pulses to achieve registration. Accordingly, the total number of ASF motor pulses for ASF roller 32*a* to rotate from the home position to achieve registration of recording medium 210 is 434 (68+190+157+19). Once the ASF motor has performed 434 pulses, the line feed motor is engaged and line feed pinch rollers 36*a* pick up recording medium 210 and begin feeding it through printer 10. At this point, like the flying load case, both ASF roller 32*a* and line feed pinch rollers 36*a* are feeding recording medium 210 simultaneously and therefore, should be running at the same rate.

Whether the load type is flying or registered, ASF roller 32*a* continues to feed recording medium 210 until a total of 577 ASF motor pulses have been achieved. Once the ASF motor has performed 577 pulses, point 205 on the circumference of ASF roller 32*a* has rotated to point 200 and flat portion 211 of ASF roller 32*a* disengages recording medium 210. At this point, recording medium 210 is fed through printer 10 by line feed pinch rollers 36*a*. The ASF motor continues to turn however until 645 motor pulses have been performed. Recall that 645 motor pulses corresponds to one full rotation of ASF roller 32*a*. Therefore, after 645 motor pulses, ASF roller 32*a* returns to its home position and waits to begin feeding the next sheet.

Figure 16B:
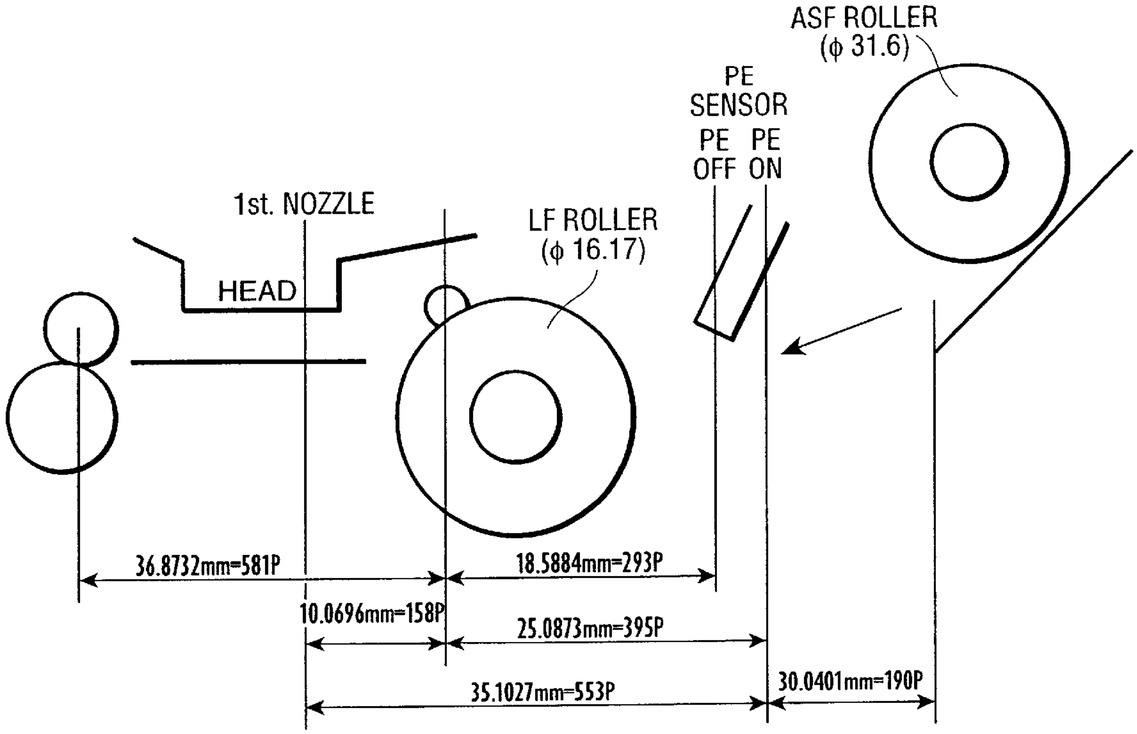
FIG. 16B depicts a relationship between ASF motor pulses and an ASF roller feed amount, as well as line feed motor pulses and a line feed amount.

FIG. 16B depicts a relationship between the ASF motor pulses and a corresponding ASF roller feed amount, as well as a relationship between line feed motor pulses and a corresponding line feed amount. As seen in FIG. 16B, the 190 motor pulses of the ASF motor described above for feeding the recording medium to turn on the PE sensor correspond to a 30.040 mm feed amount by the ASF roller. Also depicted in FIG. 16B are a relationship between line feed motor pulses and a corresponding line feed amount. It is assumed that the line feed motor is a 2-2 phase motor, that the line feed drivetrain has a gear ratio of 1:8.333, and that the line feed roller has a diameter of 16.17 mm. As such, one rotation of the line feed roller is assumed to take 800 pulses of the line feed motor and that one pulse corresponds to a 1/400 inch (0.0635 mm) line feed amount. The remaining motor pulses and feed amounts depicted in FIG. 16B depict a relationship between line feed motor pulses and line feed amounts, where the line feed amount correspond to distances for feeding the recording medium between various components of printer 10.

The invention has been described with respect to particular illustrative embodiments. It is to be understood that the invention is not limited to the above-described embodiments and that various changes and modifications may be made by those of ordinary skill in the art without departing from the spirit and scope of the invention.

What is claimed is:

1. A method of feeding a plurality of successive sheets of a recording medium into a recording apparatus, comprising the steps of:

detecting a leading edge and a page end of each of the successive sheets which are fed into the recording apparatus;

calculating a time from the page end detection of a current sheet to a leading edge detection of a next sheet; and determining a timing for commencing feeding of a next successive sheet after the next sheet according to the calculated time.

2. A method according to claim 1, wherein, feeding of a next successive sheet commences before the page end of a current sheet.

3. A method according to claim 1, wherein the timing for commencing the feeding between the current sheet and the next sheet is controlled to obtain and maintain the timing within a target range.

4. A method according to claim 1, further comprising determining whether the page end detection of the current sheet is detected within a threshold amount of time after feeding of the next successive sheet has commenced.

5. A method according to claim 4, wherein, in a case where it is determined that the page end of the current sheet is not detected within the threshold amount of time, the feeding of the next successive sheet is interrupted and a recovery process is engaged.

6. A method according to claim 5, wherein the recovery process comprises waiting for a page end detection of the current sheet and re-initiating feeding of the next successive sheet.

7. A recording apparatus comprising:

sensors for detecting a leading edge and a page end of each of the successive sheet which are fed into the recording apparatus;

calculating means that calculates a time from the page end detection of a current sheet to a leading edge detection of a next sheet; and a controller that determines a timing for commencing feeding of a next successive sheet after the next sheet according to the calculated time.

8. A recording apparatus according to claim 7, wherein feeding of a next successive sheet commences before the page end of a current sheet.

9. A recording apparatus according to claim 7, wherein the controller controls the timing between the current sheet and the next sheet to obtain and maintain the timing within a target range.

10. A recording apparatus according to claim 7, wherein the controller further determines whether the page end detection of the current sheet is detected within a threshold amount of time after feeding of the next successive sheet has commenced.

11. A recording apparatus according to claim 10, wherein, in a case where the controller determines that the page end of the current sheet is not detected within the threshold amount of time, the controller interrupts feeding of the next successive sheet and engages a recovery process.

12. A recording apparatus according to claim 11, wherein the recovery process comprises waiting for a page end detection of the current sheet and re-initiating feeding of the next successive sheet.

13. Computer executable process steps for feeding a plurality of successive sheets of a recording medium into a recording apparatus, the process steps comprising:

detecting a leading edge and a page end of each of the successive sheets which are fed into the recording apparatus;

calculating a time from the page end detection of a current sheet to a leading edge detection of a next sheet; and determining a timing for commencing feeding of a next successive sheet after the next sheet according to the calculated time.

14. Computer executable process steps according to claim 13, wherein, feeding of a next successive sheet commences before the page end of a current sheet.

15. Computer executable process steps according to claim 13, wherein the timing between the current sheet and the next successive sheet is controlled to obtain and maintain the timing within a target range.

16. Computer executable process steps according to claim 13, further comprising determining whether the page end detection of the current sheet is detected within a threshold amount of time after feeding of the next sheet has commenced.

17. Computer executable process steps according to claim 16, wherein, in a case where it is determined that the page end of the current sheet is not detected within the threshold amount of time, the feeding of the next successive sheet is interrupted and a recovery process is engaged.

18. Computer executable process steps according to claim 17, wherein the recovery process comprises waiting for a page end detection of the current sheet and re-initiating feeding of the next successive sheet.

19. A computer readable medium which stores executable process steps for feeding a plurality of successive sheets of a recording medium into a recording apparatus, the executable process steps comprising:

detecting a leading edge and a page end of each of the successive sheets which are fed into the recording apparatus;

calculating a time from the page end detection of a current sheet to a leading edge detection of a next sheet; and determining a timing for commencing feeding of a next successive sheet after the next sheet according to the calculated time.

20. A computer readable medium according to claim 19, wherein, feeding of a next successive sheet commences before the page end of a current sheet.

21. A computer readable medium according to claim 19, wherein the timing between the current sheet and the next successive sheet is controlled to obtain and maintain the timing within a target range.

22. A computer readable medium according to claim 19, further comprising determining whether the page end detection of the current sheet is detected within a threshold amount of time after feeding of the next sheet has commenced.

23. A computer readable medium according to claim 22, wherein, in a case where it is determined that the page end of the current sheet is not detected within the threshold amount of time, the feeding of the next successive sheet is interrupted and a recovery process is engaged.

24. A computer readable medium according to claim 23, wherein the recovery process comprises waiting for a page end detection of the current sheet and re-initiating feeding of the next successive sheet.

* * * * *

UNITED STATES PATENT AND TRADEMARK OFFICE

CERTIFICATE OF CORRECTION

PATENT NO. : 6,421,581 B1
DATED : July 16, 2002
INVENTOR(S) : Hamamoto et al.

It is certified that error appears in the above-identified patent and that said Letters Patent is hereby corrected as shown below:

Column 7,
Line 30, “images specifically,” should read -- images. Specifically, --.

Column 8,
Line 55, “contain” should read -- contains --.

Column 17,
Line 57, “IF” should read -- If --.

Column 20,
Line 17, “the” second occurrence should be deleted; and
Line 46, “that” should be deleted.

Column 22,
Line 6, “that” should be deleted;
Line 10, “correspond” should read -- corresponds --; and
Line 52, “sheet” should read -- sheets --.

Signed and Sealed this

Fourteenth Day of January, 2003

JAMES E. ROGAN
*Director of the United States Patent and Trademark Office*